(12) United States Patent
Min et al.

(10) Patent No.: US 9,167,230 B2
(45) Date of Patent: Oct. 20, 2015

(54) IMAGE SENSOR FOR SIMULTANEOUSLY OBTAINING COLOR IMAGE AND DEPTH IMAGE, METHOD OF OPERATING THE IMAGE SENSOR, AND IMAGE PROCESSING SYSTEM INCLUDING THE IMAGE SENSOR

(75) Inventors: Dong-ki Min, Seoul (KR); Young-gu Jin, Osan-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 1050 days.

(21) Appl. No.: 13/237,276

(22) Filed: Sep. 20, 2011

(65) Prior Publication Data

US 2012/0133737 A1  May 31, 2012

(30) Foreign Application Priority Data

Nov. 30, 2010  (KR) .......................... 10-2010-0120612

(51) Int. Cl.
*H04N 13/02*  (2006.01)
(52) U.S. Cl.
CPC ....... *H04N 13/0207* (2013.01); *H04N 13/0253* (2013.01); *H04N 13/0257* (2013.01); *H04N 13/0271* (2013.01)
(58) Field of Classification Search
None
See application file for complete search history.

(56) References Cited

U.S. PATENT DOCUMENTS

| | | | |
|---|---|---|---|
| 7,060,957 B2 * | 6/2006 | Lange et al. | 250/208.1 |
| 2004/0109170 A1 | 6/2004 | Schick | |
| 2004/0222362 A1 | 11/2004 | Zelenka et al. | |
| 2008/0239280 A1 * | 10/2008 | Watgen et al. | 356/5.1 |
| 2009/0027581 A1 * | 1/2009 | You et al. | 349/48 |
| 2009/0101791 A1 | 4/2009 | Aldiek | |
| 2009/0284731 A1 * | 11/2009 | Jin et al. | 356/4.01 |
| 2010/0073462 A1 * | 3/2010 | Lee et al. | 348/46 |
| 2010/0303299 A1 * | 12/2010 | Cho et al. | 382/106 |

FOREIGN PATENT DOCUMENTS

KR  1020100025228  3/2010

* cited by examiner

*Primary Examiner* — Sath V. Perungavoor
*Assistant Examiner* — Kate Luo
(74) *Attorney, Agent, or Firm* — F. Chau & Associates, LLC

(57) ABSTRACT

An image sensor includes a light source that emits modulated light such as visible light, white light, or white light-emitting diode (LED) light to a target object, a plurality of pixels, and an image processing unit. The pixels include at least one pixel for outputting pixel signals according to light reflected by the target object. The image processing unit simultaneously generates a color image and a depth image from the pixel signals of the at least one pixel.

17 Claims, 16 Drawing Sheets

FIG. 11A

| B | G | B |
|---|---|---|
| G | R | G |
| B | G | B |

FIG. 11B

| R | G | R |
|---|---|---|
| G | B | G |
| R | G | R |

FIG. 11C

| G | B | G |
|---|---|---|
| R | G | R |
| G | B | G |

FIG. 11D

| G | R | G |
|---|---|---|
| B | G | B |
| G | R | G |

FIG. 11E

| R | G | R |
|---|---|---|
| G | B | G |
| R | G | R |

FIG. 11F

| G | R | G |
|---|---|---|
| B | G | B |
| G | R | G |

FIG. 11G

| G | B | G |
|---|---|---|
| R | G | R |
| G | B | G |

FIG. 11H

| B | G | B |
|---|---|---|
| G | R | G |
| B | G | B |

IMAGE SENSOR FOR SIMULTANEOUSLY OBTAINING COLOR IMAGE AND DEPTH IMAGE, METHOD OF OPERATING THE IMAGE SENSOR, AND IMAGE PROCESSING SYSTEM INCLUDING THE IMAGE SENSOR

CROSS-REFERENCE TO RELATED APPLICATIONS

This application claims priority to Korean Patent Application No. 10-2010-0120612, filed on Nov. 30, 2010, in the Korean Intellectual Property Office, the disclosure of which is incorporated in its entirety by reference herein.

BACKGROUND

1. Technical Field

The inventive concept relates to an image sensor, and more particularly, to an image sensor for simultaneously obtaining a color image and a depth image, a method of operating the image sensor, and an image processing system including the image sensor.

2. Discussion of Related Art

Since digital cameras, digital camcorders, and mobile phones having a camera or camcorder function are widely used, there is a growing demand for high quality image sensors. An image sensor is a semiconductor device for converting an optical image into an electric signal. Stereoscopy refers to a technique for creating or enhancing the illusion of depth in an image by presenting two offset images separately to the left and right eye of the viewer. Since the demand for stereoscopic images have increased, there is a growing demand for image sensors that can capture image data including both color information and depth information.

SUMMARY

At least one embodiment of the inventive concept provides an image sensor for simultaneously obtaining a color image and a depth image, a method of operating the image sensor, and a computer-readable recording medium having embodied thereon a program for executing the method, and an image processing system including the image sensor.

The image sensor includes a plurality of pixels, and may simultaneously obtain a color image and a depth image from at least one pixel of the plurality of pixels.

According to an exemplary embodiment of the inventive concept, an image sensor includes a light source, a plurality of pixels, and an image processing unit. The light source emits modulated light to a target object. The pixels include at least one pixel for outputting pixel signals according to light reflected by the target object. The image processing unit simultaneously generates a color image and a depth image from the pixel signals of the at least one pixel.

The at least one pixel may output the pixel signals in response to gate signals having predetermined phase differences from the modulated light. For example, the image sensor may include a row decoder that outputs the gate signals to the at least one pixel.

The at least one pixel may include one photo-gate that responds to the gate signals in a photoelectric conversion area. The photoelectric conversion area may be formed on an integrated circuit chip. The gate signals may include first through fourth gate signals respectively having phase differences of 0, 90, 180, and 270 degrees from the modulated light, which are sequentially applied (e.g., by the row decoder) to the photo-gate to output first through fourth pixel signals.

In an alternate embodiment, the at least one pixel may include first and second photo-gates that respond to the gate signals in a photoelectric conversion area. The photoelectric conversion area may be formed on an integrated circuit chip. The gate signals may include first and third gate signals respectively having phase differences of 0 and 180 degrees from the modulated light that are simultaneously applied (e.g., by the row decoder) to the first and second photo-gates to output first and third pixel signals, and second and fourth gate signals respectively having phase differences of 90 and 270 degrees from the modulated light that are simultaneously applied (e.g., by the row decoder) to the first and second photo-gates to output second and fourth pixel signals.

The image processing unit may include a color calculator and a depth calculator. The color calculator may generate the color image by summing the first through fourth pixel signals. The depth calculator may generate the depth image based on an arc tangent of a ratio of a difference between the second pixel signal and the fourth pixel to a difference between the first pixel signal and the third pixel signal.

The modulated light may be visible light, white light, or white light-emitting diode (LED) light.

The image sensor may generate a color image of the target object by combining color images of the plurality of pixels.

The image sensor may generate a depth image of the target object by combining depth images of the plurality of pixels.

According to an exemplary embodiment of the inventive concept, a method of operating an image sensor includes emitting modulated light from a light source to a target object, acquiring pixel signals from at least one pixel on which light reflected by the target object is incident, and simultaneously generating a depth image and a color image from the pixel signals.

According to an exemplary embodiment of the inventive concept, an image processing system includes an image sensor and a processor. The processor controls the image sensor. The image sensor includes a plurality of pixels. A color image and a depth image are simultaneously obtained from at least one pixel of the plurality of pixels.

An image sensor includes a pixel and a row decoder. The pixel includes a photo-gate that is arranged to receive reflected light based on a modulated light reflected from a target object. The row decoder is configured to sequentially apply first through fourth gate signals to the photo-gate respectively having phase differences of 0, 90, 180, and 270 degrees from the modulated light to generate first through fourth pixels signals. The image sensor may further include a color calculator and a depth calculator. The color calculator generates a color image by summing the first through fourth pixel signals. The depth calculator generates a depth image based on an arc tangent of a ratio of a difference between the second pixel signal and the fourth pixel signal to a difference between the first pixel signal and the third pixel signal. The pixel may include a semiconductor substrate and a second photo-gate. The photo-gates may be disposed on top of the substrate and be spaced apart from one another. The row-decoder may be configured to apply a gate signal to the second photo-gate that has a phase difference of 180 degrees with respect to the gate signal that is being currently applied to the other photo-gate. The pixel may further include first and second charge storage areas, which are each buried partially in an upper portion of the substrate, where one is disposed to the left of and adjacent the first photo-gate and the other is disposed to the right of and adjacent the second photo-gate. The substrate may be of a first conductivity type, while the first and second charge storage areas are of a second conductivity type.

BRIEF DESCRIPTION OF THE DRAWINGS

Exemplary embodiments of the inventive concept will be more clearly understood from the following detailed description taken in conjunction with the accompanying drawings in which:

FIGS. 11A through 11H illustrate a method of interpolating colors lost in a given pixel by using bilinear interpolation according to an exemplary embodiment of the inventive concept;

DETAILED DESCRIPTION

Figure 1:
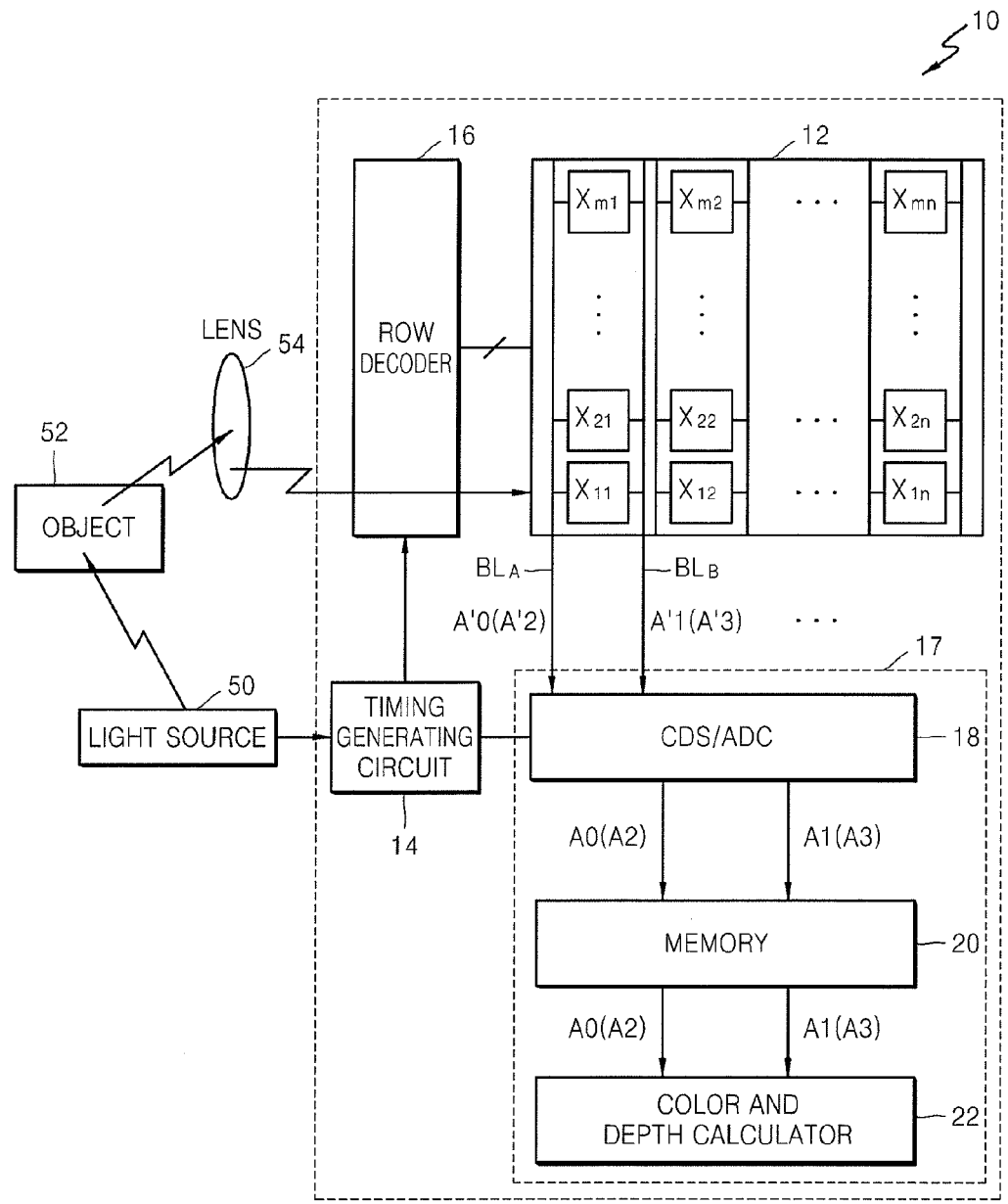
FIG. 1 is a block diagram illustrating an image sensor according to an exemplary embodiment of the inventive concept.

The inventive concept will now be described more fully with reference to the accompanying drawings, in which exemplary embodiments of the inventive concept are shown. In the drawings, the same reference numerals denote the same elements.

An image sensor includes an array of small photodiodes called pixels or photosites. Pixels can convert photons from a broad spectrum band into electrons. The pixels of the image sensor receive light in a band used for obtaining colors from among light in a broad spectrum band. The pixels of the image sensor may convert photons corresponding to a specific color into electrons using a color filter or a similar device. Accordingly, the image sensor obtains a color image.

Information about the distance between an object and an image sensor can be used to obtain a depth image. An image reconstructed by using a time of light (TOF) to represent the distance between the object and the image sensor is referred to as a depth image.

FIG. 1 is a block diagram illustrating an image sensor 10 according to an exemplary embodiment of the inventive concept.

Referring to FIG. 1, modulated light EL emitted as a pulse signal from a light source 50 reaches a target object 52 and reflected light RL reflected by the target object 52 is incident on the image sensor 10 through a lens 54. The modulated light EL may be visible light, white light, or white light-emitting diode (LED) light. The image sensor 10 receives the reflected light RL as a light signal, and converts the light signal into a color image and a depth image of the target object 52. The image sensor 10 includes a pixel array 12, a timing generating circuit 14, a row decoder 16, and an image processing unit 17.

The pixel array 12 includes a plurality of pixels Xij (i=1–m, j=1–n) arranged in a two-dimensional (2D) matrix of rows and columns, and forms an image capturing area. The image capturing area may have a rectangular shape. Each of the pixels Xij (i=1–m, j=1–n) are accessed by using a combination of a row address and a column address. Each of the pixels Xij (i=1–m, j=1–n) includes at least one photoelectric conversion element such as a photodiode, a phototransistor, a photo-gate, or a pinned photodiode. Each of the pixels Xij (i=1–m, j=1–n) may include a transfer transistor, a drive transistor, a select transistor, and a reset transistor connected to the photoelectric conversion element. Pixel signals output from each of the pixels Xij (i=1–m, j=1–n) are output through bit lines $BL_A$, $BL_B$, etc.

The timing generating circuit 14 controls operations of the row decoder 16 and the image processing unit 17. The timing generating circuit 14 may provide a timing signal and a control signal to the row decoder 16 and the image processing unit 17.

The row decoder 16 generates driving signals for driving each of the rows of the pixel array 12, for example, a transfer signal TG, a reset signal RS, and a select signal SEL, and first through fourth gate signals GA, GB, GC, and GD. The row decoder 16 selects one of the rows of the plurality of pixels Xij (i=1–m, j=1–n) of the pixel array 12 in response to the driving signals and the first through fourth gate signals GA, GB, GC, and GD.

The image processing unit 17 generates both a color image and a depth image from the pixel signals output from the pixels Xij (i=1–m, j=1 n). The color image and depth image may be generated simultaneously. The image processing unit 17 includes a correlated double sampling/analog-to-digital converter (CDS/ADC) 18, a memory 20, and a color and depth calculator 22.

The CDS/ADC 18 cancels noise by performing correlated double sampling on pixel signals of one selected row transferred to the bit lines (e.g., $BL_A$, $BL_B$, etc.) of the pixel array 12. For convenience of explanation, in FIG. 1, pixel signals A'0, A'1, A'2, and A'3 output from one pixel $X_{11}$ from among the pixel signals of the selected one row are transferred to the CDS/ADC 18 through two bit lines $BL_A$ and $BL_B$. The CDS/ADC 18 compares the pixel signals A'0, A'1, A'2, and A'3 from which the noise is canceled with a lamp signal output from a lamp generator (not shown) to obtain resultant signals. The CDS/ADC 18 converts the resultant signals into digital pixel signals A0, A1, A2, and A3.

The memory 20 stores the digital pixel signals A0, A1, A2, and A3 output from the CDS/ADC 18, and provides the digital pixel signals A0, A1, A2, and A3 to the color and depth calculator 22, which may simultaneously generate a color image and a depth image.

The color and depth calculator 22 calculates both color information and depth information of the pixel X11 based on the digital pixel signals A0, A1, A2, and A3 and generates a color image and a depth image. The color and depth calculator 22 may calculate the color and depth information simultaneously. An operation of the color and depth calculator 22 will be explained below.

Figure 2:
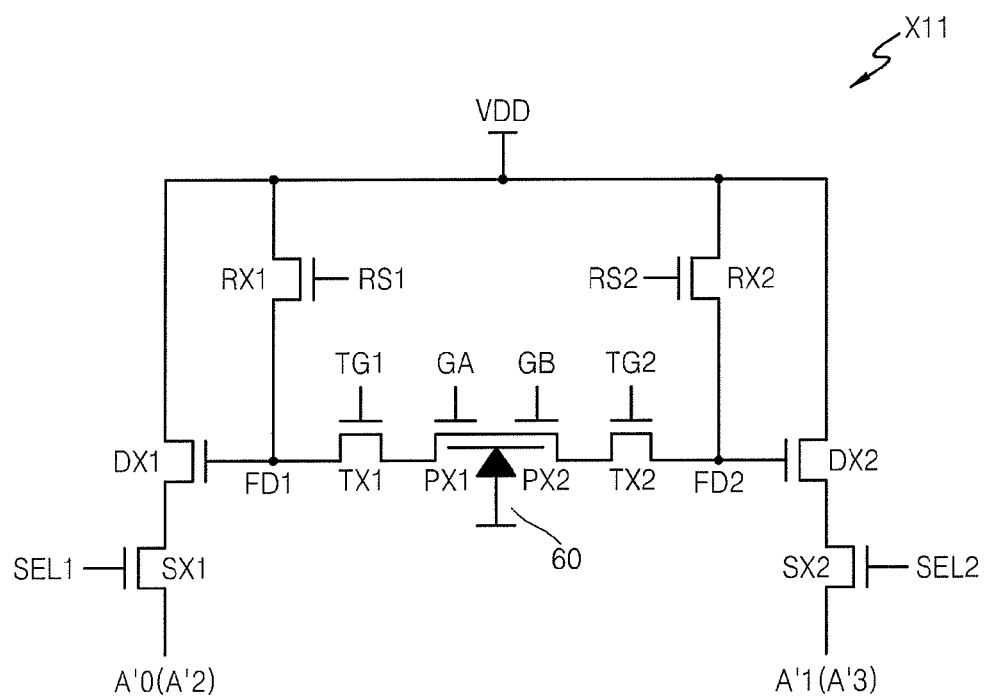
FIG. 2 is a circuit diagram illustrating an equivalent circuit of one pixel of the image sensor of FIG. 1 according to an exemplary embodiment of the inventive concept.

FIG. 2 is a circuit diagram illustrating an equivalent circuit of one pixel X11 of the image sensor of FIG. 1 according to an exemplary embodiment of the inventive concept.

Referring to FIG. 2, the pixel X11 has a 2-tap pixel structure in which two photo-gates PX1 and PX2 are formed in a photoelectric conversion area 60. The pixel X11 includes a first transfer transistor TX1, a first drive transistor DX1, a first select transistor SX1, and a first reset transistor RX1 connected to the first photo-gate PX1. The pixel X11 also includes a second transfer transistor TX2, a second drive transistor DX2, a second select transistor SX2, and a second reset transistor RX2 connected to the second photo-gate PX2.

The photoelectric conversion area 60 is capable of sensing light. The photoelectric conversion area 60 generates electron-hole pairs (EHPs) by using the sensed light. A depletion area is formed in the first photo-gate PX1 due to a voltage applied as the first gate signal GA. Electrons and holes of the EHPs are separated from each other due to the depletion area, and the electrons accumulate under the first photo-gate PX1.

The first transfer transistor TX1 has a gate to which a first transfer signal TG1 is applied, a drain to which the first photo-gate PX1 is connected, and a source to which a first floating diffusion area FD1 is connected. The first transfer transistor TX1 transfers the electrons under the first photo-gate PX1 in response to the first transfer signal TG1. The first transfer transistor TX1 electrically connects or separates the first photo-gate PX1 and the first floating diffusion area FD1 by using the first transfer signal TG1.

The first drive transistor DX1 has a gate to which the first floating diffusion area FD1 is connected, a drain to which a power voltage VDD is applied, and a source to which the first select transistor SX1 is connected. A voltage of a source terminal of the first drive transistor DX1 is determined by a voltage of the first floating diffusion area FD1. The voltage of the first floating diffusion area FD1 is determined by the number of electrons transferred from the first photo-gate PX1.

The first select transistor SX1 has a gate to which a first select signal SEL1 is applied, which is a row control signal, a drain to which the source of the first drive transistor DX1 is connected, and a source to which a bit line (not shown) in the pixel array 12 is connected. The pixel signals A'0 and A'2 are output to the bit line $BL_A$ from the pixel array 12.

The first reset transistor RX1 has a gate to which a first reset signal RS1 is applied, a drain to which the power voltage VDD is applied, and a source to which the first floating diffusion area FD1 is connected. After pixel information detection is performed based on the voltage of the first floating diffusion area FD1, if the first reset signal RS1 is enabled, the first reset transistor RX1 resets the voltage of the first floating diffusion area FD1 to the power voltage VDD.

A depletion area is formed due to a voltage applied as the second gate signal GB to the second photo-gate PX2. Holes and electrons of EHPs are separated from each other due to the depletion area, and the electrons accumulate under the second photo-gate PX2.

The second transfer transistor TX2 has a gate to which a second transfer signal TG2 is applied, a drain to which the second photo-gate PX2 is connected, and a source to which a second floating diffusion area FD2 is connected. The second transfer transistor TX2 transfers the electrons under the second photo-gate PX2 to the second floating diffusion area FD2 in response to the second transfer signal TG2. The second transfer transistor TX2 electrically connects or separates the second photo-gate PX2 and the second floating diffusion area FD2 by using the second transfer signal TG2.

The second drive transistor DX2 has a gate to which the second floating diffusion area FD2 is connected, a drain to which the power voltage VDD is applied, and a source to which the second select transistor SX2 is connected. A voltage of a source terminal of the second drive transistor DX2 is determined by a voltage of the second floating diffusion area FD2. The voltage of the second floating diffusion area FD2 is determined by the number of electrons transferred from the second photo-gate PX2.

The second select transistor SX2 has a gate to which a second select signal SEL2 is applied, which is a row control signal, a drain to which the source of the second drive transistor DX2 is connected, and a source to which a bit line (not shown) of the pixel array 12 is connected. The pixel signals A'1 and A'3 are output to the bit line $BL_B$ from the pixel array 12.

The second reset transistor RX2 has a gate to which a second reset signal RS2 is applied, a drain to which the power voltage VDD is applied, and a source to which the second floating diffusion area FD2 is connected. After pixel information detection is performed based on the voltage of the second floating diffusion area FD2, if the second reset signal RS2 is enabled, the second reset transistor RX2 resets the voltage of the second floating diffusion area FD2 to the power voltage VDD.

Figure 3:
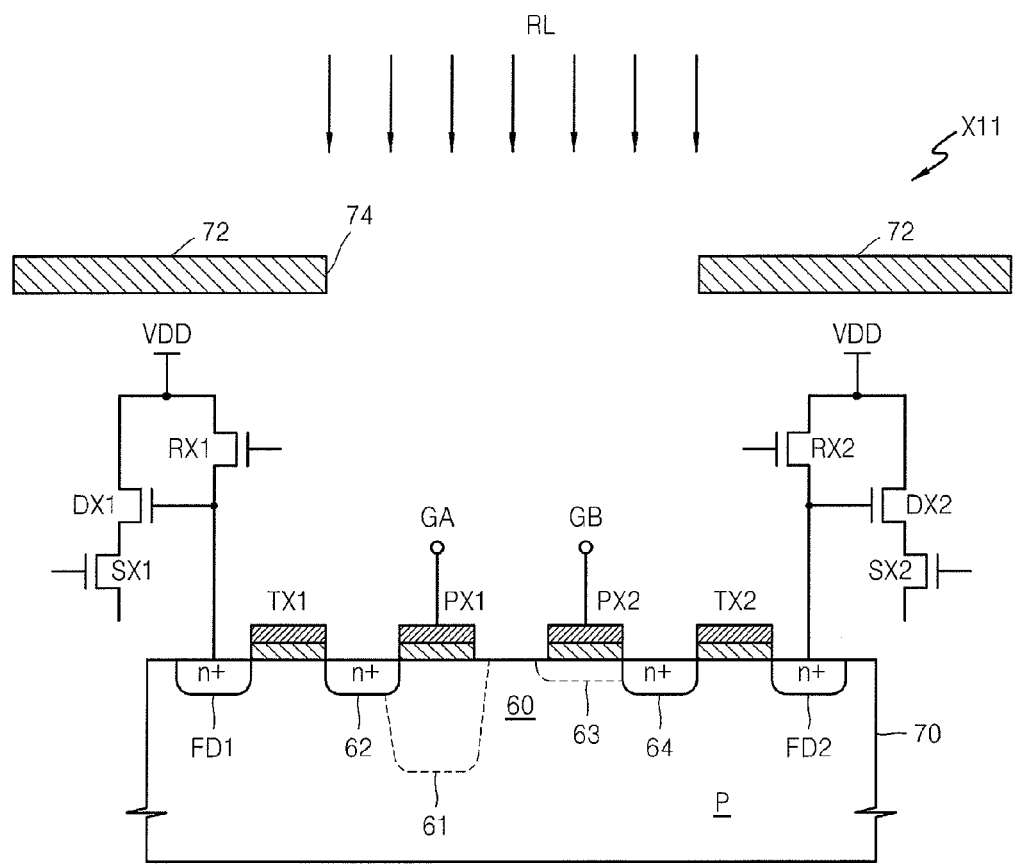
FIG. 3 is a cross-sectional view illustrating a part of a semiconductor device corresponding to the equivalent circuit of the pixel of FIG. 2 according to an exemplary embodiment of the inventive concept.

FIG. 3 is a cross-sectional view illustrating a part of a semiconductor device corresponding to the equivalent circuit of the pixel X11 of FIG. 2 according to an exemplary embodiment of the inventive concept.

Referring to FIG. 3, the photoelectric conversion area 60 that receives the reflected light RL from the target object 52 (see FIG. 1) as a light signal and generates EHPs is formed in a semiconductor substrate 70. The semiconductor substrate 70 may be a first conductivity-type semiconductor substrate, for example, a p-type semiconductor substrate. The first and second photo-gates PX1 and PX2 are formed on the photoelectric conversion area 60 to be spaced apart from each other. Charge storage areas 62 and 64 for accumulating electrons separated from the EHPs due to the photo-gates PX1 and PX2 are partially buried in an upper portion of the semiconductor substrate 70. In an embodiment of the inventive concept, the charge storage area 62 and 64 are heavily doped second conductivity-type charge storage areas, for example, heavily doped n+ type charge storage areas. The first and second floating diffusion areas FD1 and FD2 are buried in the upper portion of the semiconductor substrate 70 such that they are spaced apart from the charge storage areas 62 and 64. In an embodiment of the inventive concept, the first and second floating diffusion areas FD1 and FD2 are heavily doped second conductivity-type floating diffusion areas. Gate electrodes of the first and second transfer transistors TX1 and TX2 are formed on the semiconductor substrate 70 between the charge storage areas 62 and 64 and the first and second floating diffusion areas FD1 and FD2.

The modulated light EL emitted from the light source 50 illustrated in FIG. 1 reaches the target object 52, and the reflected light RL is reflected by the target object 52 and is incident on each of the pixels Xij (i=1–m, j=1–n) through the lens 54. In the pixel X11 of the pixels Xij (i=1–m, j=1–n), the reflected light RL is incident through an opening 74 of a shield film 72 on the photoelectric conversion area 60. The photoelectric conversion area 60 generates EHPs by using the reflected light RL. The first gate signal GA and the second gate signal GB are respectively applied to the first photo-gate PX1 and the second photo-gate PX2. The first gate signal GA and the second gate signal GB are applied as pulse voltages having phases that are different from one another. For example, the phase difference between the first gate signal GA and the second gate signal GB may be 180 degrees.

For example, if a voltage of about 2 to 3 V is applied as the first gate signal GA, a depletion area 61 may mostly form in the photoelectric conversion area 60 under the first photo-gate PX1. Electrons of the EHPs generated by the reflected light RL move to the charge storage area 62 along the depletion area 61 to be stored in the charge storage area 62. When a ground voltage VSS is applied as the second gate voltage GB, a depletion region 63 may be unlikely to form in the photoelectric conversion area 60 under the second photo-gate PX2.

Likewise, if a voltage of about 2 to 3 V is applied as the second gate signal GB, the depletion area 63 may mostly form in the photoelectric conversion area 60 under the second photo-gate PX2. Electrons of the EHPs generated by the reflected light RL may move to the charge storage area 64 along the depletion area 63 to be stored in the charge storage area 64. When the ground voltage VSS is applied as the first gate voltage GA, the depletion area 61 may be unlikely to form in the photoelectric conversion area 60 under the first photo-gate PX1.

Figure 4:
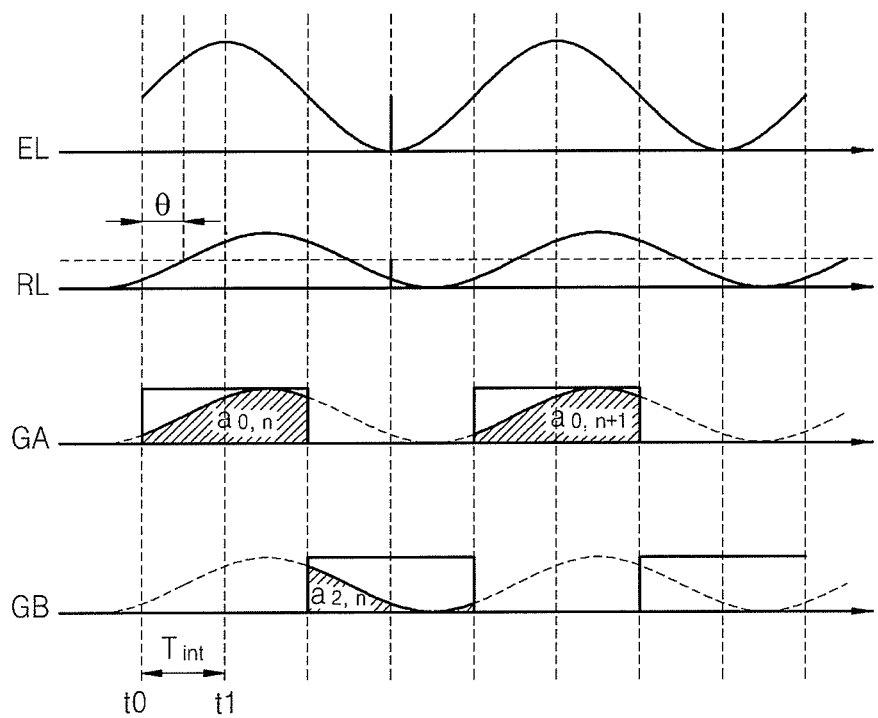
FIG. 4 is a diagram for explaining operations of first and second photo-gates of the semiconductor device of FIG. 3, according to an exemplary embodiment of the inventive concept.

FIG. 4 is a diagram for explaining operations of the first and second photo-gates PX1 and PX2 of FIG. 3, according to an exemplary embodiment of the inventive concept.

Referring to FIG. 4, the modulated light EL emitted from the light source 50 (see FIG. 1) and the reflected light RL reflected by the target object 52 and incident on the pixel X11 are illustrated. Tint denotes an integration time during which light is emitted. A phase difference θ̂ denotes a difference between a time at which the reflected light RL is reflected by the target object 52 and a time at which the reflected light RL is sensed by the image sensor 10 (see FIG. 1). Distance information between the target object 52 and the image sensor 10 may be calculated from the phase difference θ̂.

The first gate signal GA applied to the first photo-gate PX1 and the second gate signal GB applied to the second photo-gate PX2 have a phase difference of 180 degrees. The first pixel signal A'0 accumulated in the charge storage area 62 in response to the first gate signal GA is shown as a portion where the first gate signal GA and the reflected light RL overlap each other. The second pixel signal A'2 accumulated in the charge storage area 64 in response to the second gate signal GB is shown as a portion where the second gate signal GB and the reflected light RL overlap each other. The first pixel signal A'0 and the second pixel signal A'2 may be defined by Equation 1.

$$A'_0 = \sum_{n=1}^{N} a1,n \qquad \text{[Equation 1]}$$

$$A'_2 = \sum_{n=1}^{N} a2,n$$

Here, $a_{1,n}$ denotes the number of electrons generated by the pixel X11 when the first gate signal GA having a phase difference of 0 degrees from the modulated light EL is applied 'n' times (n is a natural number), and $a_{2,n}$ denotes the number of electrons generated by the pixel X11 when the second gate signal GB having a phase difference of 180 degrees from the modulated light EL is applied 'n' times (n is a natural number). N is a value obtained by multiplying a frequency fm of the modulated light EL by the integration time Tint, (e.g., N=fm*Tint).

Figure 5:
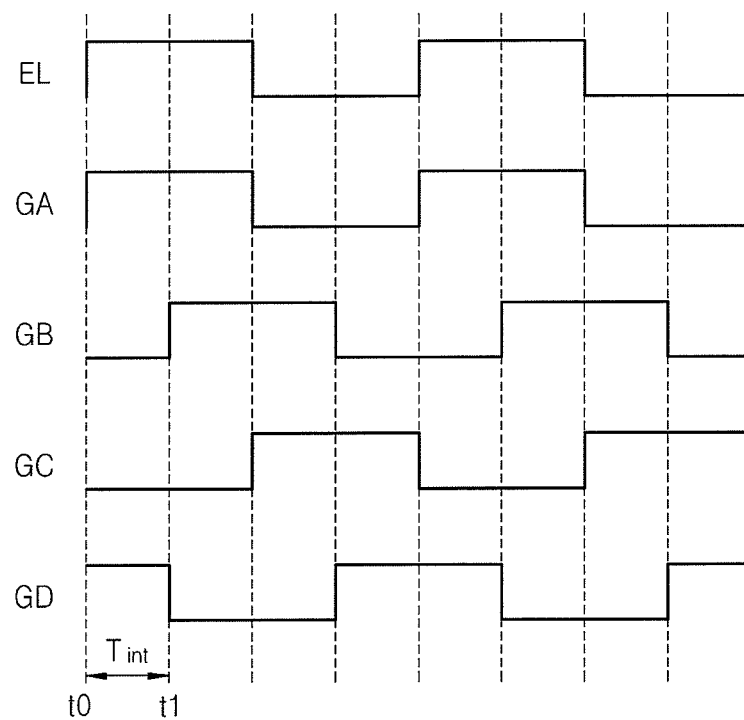
FIG. 5 is a diagram for explaining operations of the first and second photo-gates of the semiconductor device of FIG. 3, according to an exemplary embodiment of the inventive concept.

FIG. 5 is a diagram for explaining operations of the first and second photo-gates PX1 and PX2 of FIG. 3, according to an exemplary embodiment of the inventive concept.

Referring to FIG. 5, the modulated light EL emitted from the light source 50 (see FIG. 1) and the reflected light RL reflected by the target object 52 and incident on the pixel X11 are illustrated. The first and third gate signals GA and GC having a phase difference of 180 degrees are respectively applied to the first photo-gate PX1 and the second photo-gate PX2, and the second and fourth gate signals GB and GD having a phase difference of 180 degrees are respectively applied to the first photo-gate PX1 and the second photo-gate PX2. The first and third gate signals GA and GC and the second and fourth gate signals GB and GD are sequentially applied every integration time Tint.

At a time t0, the first pixel signal A'0 accumulated in the charge storage area 62 in response to the first gate signal GA and the third pixel signal A'2 stored in the charge storage area 64 are output in response to the third gate signal GC.

At a second time t1, the second pixel signal A'1 accumulated in the charge storage area 62 and the fourth pixel signal A'3 stored in the charge storage area 64 in response to the fourth gate signal GD are output in response to the second gate signal GB. The integration time Tint is present between the first time t0 and the second time t1.

The first pixel signal A'0, the second pixel signal A'1, the third pixel signal A'2, and the fourth pixel signal A'3 may be defined by Equation 2.

$$A'_k = \sum_{n=1}^{N} a_{k,n} \qquad \text{[Equation 2]}$$

Here, $a_{k,n}$ denotes the number of electrons generated by the pixel X11 when an nth (n is a natural number) gate signal having a phase difference corresponding to k is applied. When a phase difference between the modulated light EL and the first gate signal GA is 0, k is 0. When a phase difference between the modulated light EL and the second gate signal GB is 90 degrees, k is 1. When a phase difference between the modulated light EL and the third gate signal GC is 180 degrees, k is 2. When a phase difference between the modulated light EL and the fourth gate signal GD is 270 degrees, k is 3. N=fm*Tint, where fm denotes a frequency of the modulated light EL, and Tint denotes an integration time.

The first through fourth pixel signals A'0, A'1, A'2, and A'3 may be defined by Equation 3.

$$A'_0 = \alpha + \beta \cos\theta$$

$$A'_1 = \alpha + \beta \sin\theta$$

$$A'_2 = \alpha - \beta \cos\theta$$

$$A'_3 = \alpha - \beta \sin\theta \quad \text{[Equation 3]}$$

Here, α denotes a background offset, and β denotes a demodulation intensity. The demodulation intensity β refers to the intensity of the reflected light RL.

The phase difference $\hat{\theta}$ may be defined by Equation 4.

$$\hat{\theta} = 2\pi f_m t_\Delta = \tan^{-1}\frac{A_1 - A_3}{A_0 - A_2} \quad \text{[Equation 4]}$$

The image sensor 10 may estimate a time difference $t_\Delta$ between the modulated light EL emitted from the light source 50 and the reflected light RL reflected by the target object 52 and a distance 'd' between the image sensor 10 and the target object 52 as shown in Equation 5.

$$t_\Delta = \frac{2d}{c} \quad \text{[Equation 5]}$$

Here, 'c' denotes the velocity of light.

Accordingly, the color and depth calculator 22 may calculate depth information $\hat{d}$ by using Equation 4 and Equation 5 as shown in Equation 6.

$$\hat{d} = \frac{c}{4\pi f_m}\hat{\theta} \quad \text{[Equation 6]}$$

Figure 6:
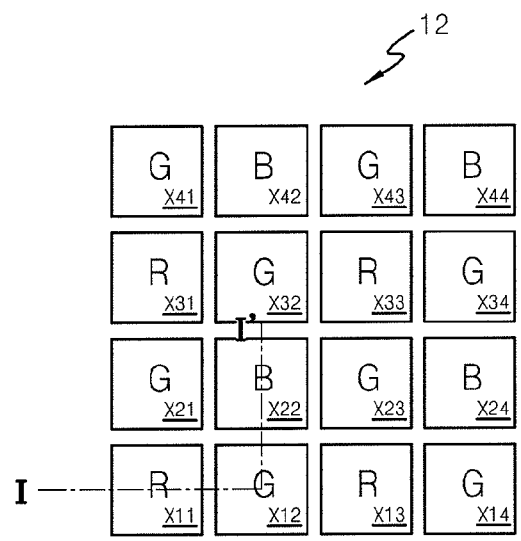
FIG. 6 is a diagram illustrating a color filter array placed on a pixel array of the image sensor of FIG. 1 according to an exemplary embodiment of the inventive concept.

A color filter array of FIG. 6 may be placed on the pixel array 12 to enable the image sensor 10 of FIG. 1 to acquire a color image.

FIG. 6 is a diagram illustrating the color filter array placed on the pixel array 12 of the image sensor 10 of FIG. 1. Referring to FIG. 6, the color filter array includes a plurality of color filters each corresponding to each of the pixels Xij (i=1–m, j=1–n). In each 2×2 set of pixels, two pixels which diagonally face each other have green filters, and the remaining two pixels have a red filter and a blue filter. Since human eyes have a higher sensitivity to a green color, two green filters are used. The color filter array has a Bayer pattern.

A pixel indicated by "R" performs an operation of obtaining a pixel image having a red color, a pixel indicated by "G" performs an operation of obtaining a pixel image having a green color, and a pixel indicated by "B" performs an operation of obtaining a pixel image having a blue color.

Although the Bayer pattern based on red, green, and blue colors is illustrated in FIG. 6, embodiments of the present inventive concept are not limited thereto, as various filter patterns may be used. For example, a CMY color pattern based on cyan, magenta, and yellow colors may be used.

Figure 7:
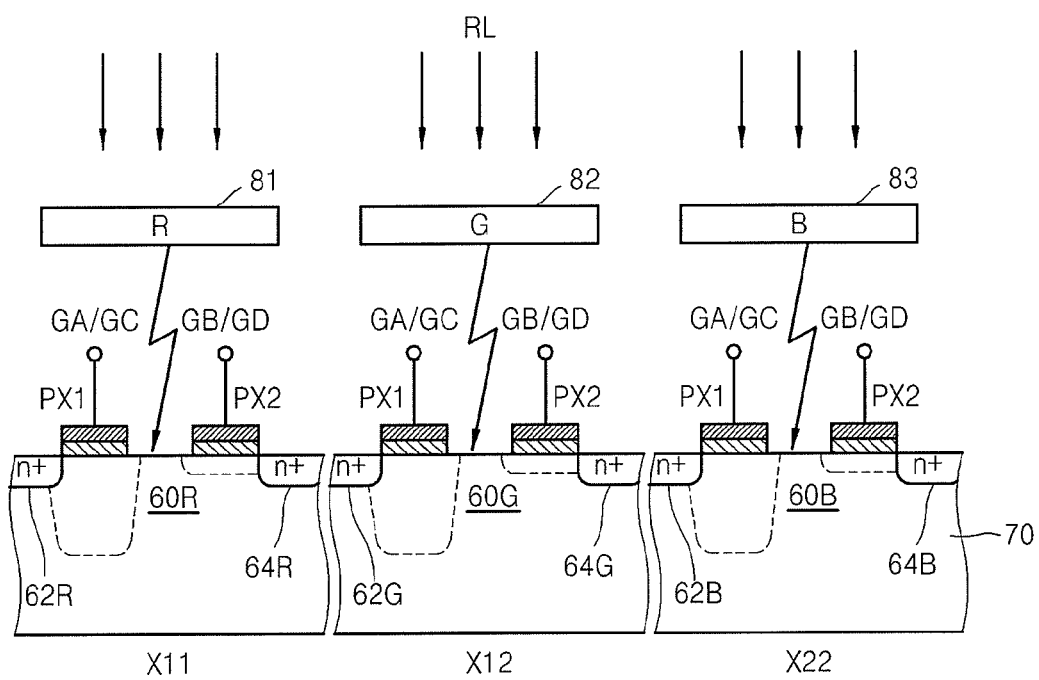
FIG. 7 is a partial cross-sectional view taken along line I-I' of the pixel array of FIG. 6 according to an exemplary embodiment of the inventive concept.

FIG. 7 is a partial cross-sectional view taken along line I-I' of the pixel array 12 in FIG. 6 according to an exemplary embodiment of the inventive concept.

For convenience of explanation, only a portion where the reflected light RL is incident on the photoelectric conversion area 60 of photo-gates X11, X12, and X22 through the opening 74 of the shield film 72 in FIG. 3 is illustrated.

Referring to FIG. 7, after the modulated light EL is emitted from the light source 50 (see FIG. 1), the reflected light RL is reflected by the target object 52 and incident on the photo-gates X11, X12, and X22. In the pixel X11, red reflected light passing through a red filter 81 is incident on a photoelectric conversion area 60R. The photoelectric conversion area 60R generates EHPs by using the red reflected light. In the pixel X12, green reflected light passing through a green filter 82 is incident on a photoelectric conversion area 60G. The photoelectric conversion area 60G generates EHPs by using the green reflected light. In the pixel X22, blue reflected light passing through a blue filter 83 is incident on a photoelectric conversion area 60B. The photoelectric conversion area 60B generates EHPs by using the blue reflected light.

In the pixel X11, which is a red pixel, the first and third gate signals GA and GC having a phase difference of 180 degrees are respectively applied to the first photo-gate PX1 and the second photo-gate PX2, and the second and fourth gate signals GB and GD having a phase difference of 180 degrees are respectively applied to the first photo-gate PX1 and the second photo-gate PX2. The first and third gate signals GA and GC and the second and fourth gate signals GB and GD are sequentially applied every integration time Tint.

A first pixel signal A'0,R accumulated in a charge storage area 62R is output in response to the first gate signal GA and a third pixel signal A'2,R stored in a charge storage area 64R is output in response to the third gate signal GC. After the integration time Tint elapses, a second pixel signal A'1,R accumulated in the charge storage area 62R is output in response to the second gate signal GB and a fourth pixel signal A'3,R stored in the charge storage area 64R is output in response to the fourth gate signal GD.

The first pixel signal A'0,R, the second pixel signal A'1,R, the third pixel signal A'2,R, and the fourth pixel signal A'3,R in the pixel X11 may be defined by Equation 7.

$$A'_{0,R} = \alpha_R + \beta_R \cos\theta_R$$

$$A'_{1,R} = \alpha_R + \beta_R \sin\theta_R$$

$$A'_{2,R} = \alpha_R - \beta_R \cos\theta_R$$

$$A'_{3,R} = \alpha_R - \beta_R \sin\theta_R \quad \text{[Equation 7]}$$

In Equation 7, a red color value of the pixel X11 may be extracted through signal processing from a background offset $\alpha_R$ or a demodulation intensity $\beta_R$. The first pixel signal A'0,R, the second pixel signal A'1,R, the third pixel signal A'2,R, and the fourth pixel signal A'3,R in the pixel X11 are output as timing signals as shown in FIG. 8.

Figure 8:
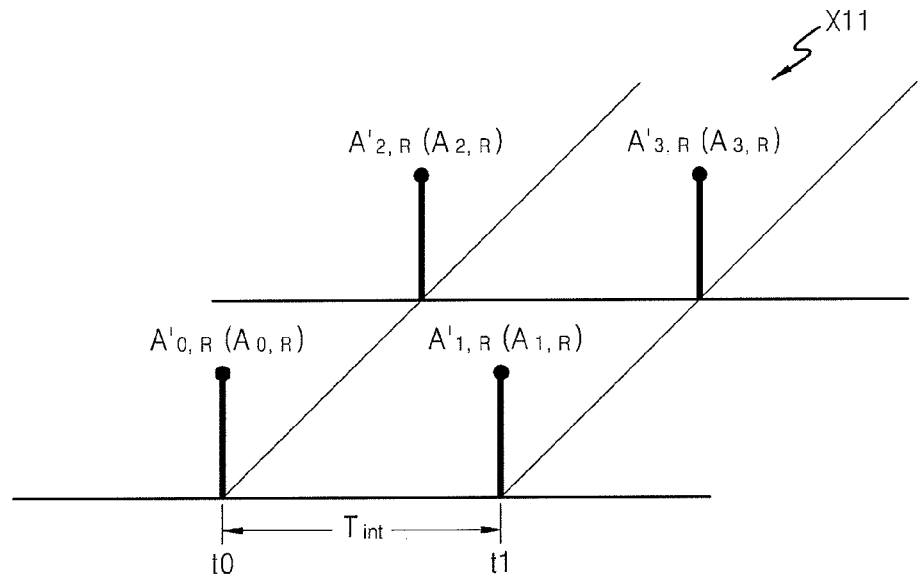
FIG. 8 is a diagram illustrating first through fourth pixel signals in a red pixel of the pixel array of FIG. 6 according to an exemplary embodiment of the inventive concept.

FIG. 8 is a diagram illustrating the first through fourth pixel signals A'0,R, A'1,R, A'2,R, and A'3,R of the pixel X11 of the pixel array 12 of FIG. 6 according to an exemplary embodiment of the inventive concept. Referring to FIG. 8, as shown in FIG. 5, at a first time t0, when first and third gate signals GA1 and GC1 having a phase difference of 180 degrees are applied to the pixel X11, the pixel X11 outputs the first and third pixel signals A'0,R and A'2,R, which may be simultaneously measured. At a second time t1, when second and fourth gate signals GB1 and GD1 having a phase difference of 180 degrees are applied to the pixel X11, the pixel X11 outputs the second and fourth pixel signals A'1,R and A'3,R, which may be simultaneously measured. The integration time Tint is present between the first time t0 and the second time t1.

Since the pixel X11 may not be able to simultaneously measure all the pixel signals A'0,R, A'1,R, A'2,R, and A'3,R, the pixel X11 can first measure two pixel signals and then after the integration time Tint elapses, measures the remaining two pixel signals.

The first through fourth pixel signals A'0,R, A'1,R, A'2,R, and A'3,R of the pixel X11 are subjected to correlated double sampling through the CDS/ADC 18, are subjected to analog-to-digital conversion, and then are output as first through fourth digital pixel signals A0,R, A1,R, A2,R, and A3,R, respectively.

The color and depth calculator 22 calculates red color information $C_R$ by summing the first through fourth digital pixel signals A0,R, A1,R, A2,R, and A3,R as shown in Equation 8.

$$C_R = A_{0,R} + A_{1,R} + A_{2,R} + A_{3,R} \quad \text{[Equation 8]}$$

The color and depth calculator 22 may estimate a phase difference $\hat{\theta}_R$ of the pixel X11 from the first through fourth digital pixel signals A0,R, A1,R, A2,R, and A3,R of the pixel X11 based on Equation 9.

$$\hat{\theta}_R = 2\pi f_m t_{\Delta,R} = \tan^{-1}\frac{A_{1,R} - A_{3,R}}{A_{0,R} - A_{2,R}} \quad \text{[Equation 9]}$$

Accordingly, depth information $\hat{d}_R$ of the pixel X11 is calculated by the color and depth calculator 22 as shown in Equation 10.

$$\hat{d}_R = \frac{c}{4\pi f_m}\hat{\theta}_R \quad \text{[Equation 10]}$$

In the pixel X12 of FIG. 7, the first and third gate signals GA and GC having a phase difference of 180 degrees are respectively applied to the first photo-gate PX1 and the second photo-gate PX2, and the second and fourth gate signals GB and GD having a phase difference of 180 degrees are respectively applied to the first photo-gate PX1 and the second photo-gate PX2. The first and third gate signals GA and GC and the second and fourth gate signals GB and GD are sequentially applied every integration time Tint.

A first pixel signal A'0,G accumulated in a charge storage area 62G is output in response to the first gate signal GA and a third pixel signal A'2,G stored in a charge storage area 64G is output in response to the third gate signal GC. After the integration time Tint elapses, a second pixel signal A'1,G accumulated in the charge storage area 62G is output in response to the second gate signal GB and a fourth pixel signal A'3,G stored in the charge storage area 64G is output in response to the fourth gate signal GD.

The first pixel signal a'0,G, the second pixel signal A'1,G, the third pixel signal A'2,G, and the fourth pixel signal A'3,G in the pixel X12, may be defined by Equation 11.

$$A'_{0,G} = \alpha_G + \beta_G \cos\theta_G$$

$$A'_{1,G} = \alpha_G + \beta_G \sin\theta_G$$

$$A'_{2,G} = \alpha_G - \beta_G \cos\theta_G$$

$$A'_{3,G} = \alpha_G - \beta_G \sin\theta_G \quad \text{[Equation 11]}$$

In Equation 11, a green color value of the pixel X12 may be extracted through signal processing from a background offset $\alpha_G$ or a demodulation intensity $\beta_G$. In the pixel X12, which is a green pixel, the first pixel signal a'0,G, the second pixel signal A'1,G, the third pixel signal A'2,G, and the fourth pixel signal A'3,G are output as timing signals as shown in FIG. 9.

Figure 9:
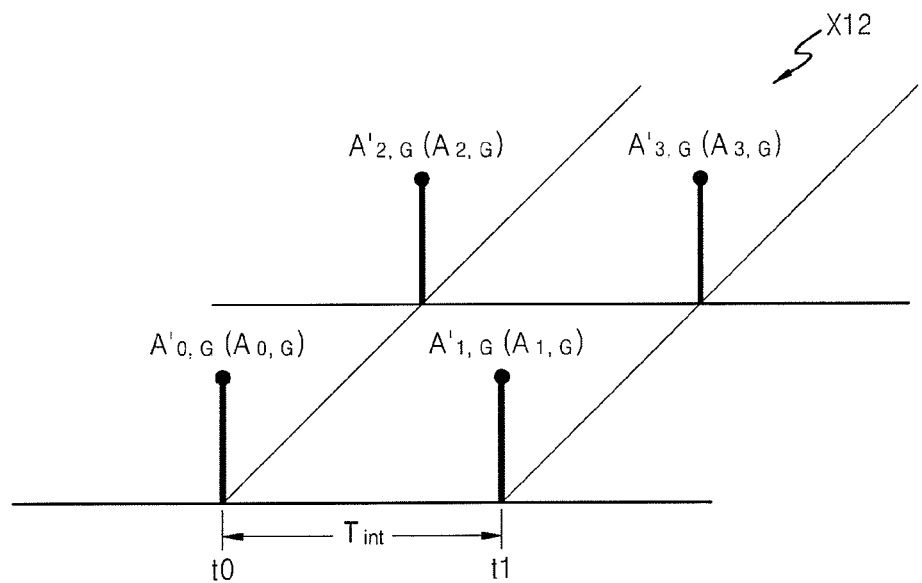
FIG. 9 is a diagram illustrating first through fourth pixel signals in a green pixel of the pixel array of FIG. 6 according to an exemplary embodiment of the inventive concept.

FIG. 9 is a diagram illustrating the first through fourth pixel signals a'0,G, A'1,G, A'2,G, and A'3,G of the pixel X12 of the pixel array 12 of FIG. 6 according to an exemplary embodiment of the inventive concept. Referring to FIG. 9, at a first time t0, as shown in FIG. 5, when the first and third gate signals GA and GC having a phase difference of 180 degrees are applied to the pixel X12, the pixel X12 outputs the first and third pixel signals A'0,G and A'2,G, which may be measured simultaneously. At a time t1, when the second and fourth gate signals GB and GD having a phase difference of 180 degrees are applied to the pixel X12, the pixel X12 outputs the second and fourth pixel A'1,G and A'3,G, which may be measured simultaneously. The integration time Tint is present between the first time t0 and the second time t1.

Since the pixel X12 may not be able to simultaneously measure all the pixel signals A'0,G, A'1,G, A'2,G, and A'3,G, the pixel X12 can measure two pixel signals two times with the time difference Tint.

The first through fourth pixel signals A'0,G, A'1,G, A'2,G, and A'3,G of the pixel X12 are subjected to correlated double sampling through the CDS/ADC 18, are subjected to analog-to-digital conversion, and are respectively output as first through fourth digital pixel signals A0,G, A1,G, A2,G, and A3,G.

The color and depth calculator 22 calculates green color information $C_G$ by summing the first through fourth digital pixel signals A0,G, A1,G, A2,G, and A3,G of the pixel X12 as shown in Equation 12.

$$C_G = A_{0,G} + A_{1,G} + A_{2,G} + A_{3,G} \quad \text{[Equation 12]}$$

The color and depth calculator 22 (see FIG. 1) may estimate a phase difference $\hat{\theta}_G$ of the pixel X12 from the first through fourth digital pixel signals A0,G, A1,G, A2,G, and A3,G of the pixel X12 based on Equation 13.

$$\hat{\theta}_G = 2\pi f_m t_{\Delta,G} = \tan^{-1}\frac{A_{1,G} - A_{3,G}}{A_{0,G} - A_{2,G}} \quad \text{[Equation 13]}$$

Accordingly, depth information $\hat{d}_G$ of the pixel X12 is calculated by the color and depth calculator 22 as shown in Equation 14.

$$\hat{d}_G = \frac{c}{4\pi f_m}\hat{\theta}_G \quad \text{[Equation 14]}$$

In the pixel X22 of FIG. 7, the first and third gate signals GA and GC having a phase difference of 180 degrees are respectively applied to the first photo-gate PX1 and the second photo-gate PXC2, and the second and fourth gate signals GB and GD having a phase difference of 180 degrees are respectively applied to the first photo-gate PX1 and the second photo-gate PX2. The first and third gate signals GA and GC and the second and fourth gate signals GB and GD are sequentially applied every integration time Tint.

A first pixel signal A'0,B accumulated in a charge storage area 62B is output in response to the first gate signal GA and a third pixel signal A'2,B stored in a charge storage area 64B is output in response to the third gate signal GC. After the integration time Tint elapses, a second pixel signal A'1,B accumulated in the charge storage area 62B is output in response to the second gate signal GB and a fourth pixel signal A'3,B stored in the charge storage area 64B is output in response to the fourth gate signal GD.

The first pixel signal A'0,B, the second pixel signal A'1,B, the third pixel signal A'2,B, and the fourth pixel signal A'3,B in the pixel X22, may be defined by Equation 15.

$$A'_{0,B} = \alpha_B + \beta_B \cos\theta_B$$
$$A'_{1,B} = \alpha_B + \beta_B \sin\theta_B$$
$$A'_{2,B} = \alpha_B - \beta_B \cos\theta_B$$
$$A'_{3,B} = \alpha_B - \beta_B \sin\theta_B \quad \text{[Equation 15]}$$

In Equation 15, a blue color value of the pixel X22 may be extracted through signal processing from a background offset $\alpha_B$ or a demodulation intensity $\beta_B$. In the pixel X22, which is a blue pixel, the first pixel signal A'0,B, the second pixel signal A'1,B, the third pixel signal A'2,B, and the fourth pixel signal A'3,B are output as timing signals as shown in FIG. 10.

Figure 10:
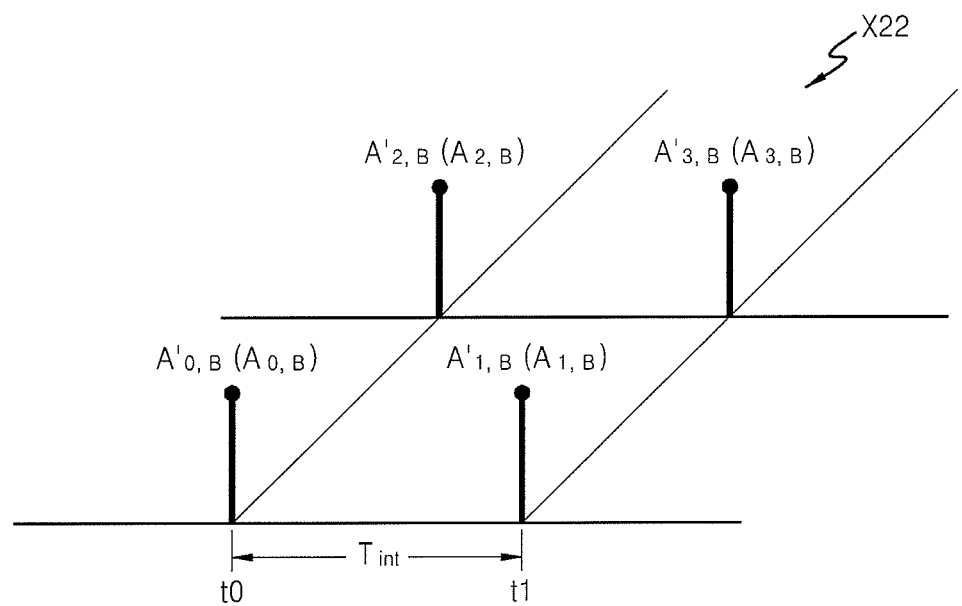
FIG. 10 is a diagram illustrating first through fourth pixel signals in a blue pixel of the pixel array of FIG. 6 according to an exemplary embodiment of the inventive concept.

FIG. 10 is a diagram illustrating the first through fourth pixel signals A'0,B, A'1,B, A'2,B, and A'3,B in the pixel X22 of the pixel array 12 of FIG. 6. Referring to FIG. 10, at a first time t0, as shown in FIG. 5, when the first and third gate signals GA and GC having a phase difference of 180 degrees are applied to the pixel X22, the pixel X22 outputs the first and third pixel signals A'0,B and A'2,B, which may be measured simultaneously. When the second and fourth gate signals GB and GD having a phase difference of 180 degrees are applied to the pixel X22, the pixel X22 outputs the second and fourth pixel signals A'1,B and A'3,B, which may be measured simultaneously. The integration time Tint is present between the first time t0 and the second time t1.

Since the pixel X22 may not be able to simultaneously measure the pixel signals A'0,B, A'1,B, A'2,B, and A'3,B, the pixel X22 can first measure two pixel signals and then after the integration time Tint elapses, measures the remaining twice pixel signals.

The first through fourth pixel signals A'0,B, A'1,B, A'2,B, and A'3,B of the pixel X22 are subjected to correlated double sample through the CDS/ADC 18 (see FIG. 1), are subjected to analog-to-digital conversion, and are respectively output as first through fourth digital pixel signals A0,B, A1,B, A2,B, and A3,B.

The color and depth calculator 22 (see FIG. 1) calculates blue color information $C_B$ by summing the first through fourth digital pixel signals A0,B, A1,B, A2,B, and A3,B of the pixel X22 as shown in Equation 16.

$$C_B = A_{0,B} + A_{1,B} + A_{2,B} + A_{3,B} \quad \text{[Equation 16]}$$

The color and depth calculator 22 may estimate a phase difference $\hat{\theta}_B$ of the pixel X22 from the first through fourth digital pixel signals A0,B, A1,B, A2,B, and A3,B of the pixel X22 based on Equation 17.

$$\hat{\theta}_B = 2\pi f_m t_{\Delta,B} = \tan^{-1}\frac{A_{1,B} - A_{3,B}}{A_{0,B} - A_{2,B}} \quad \text{[Equation 17]}$$

Accordingly, depth information $\hat{d}_B$ of the pixel X12 is calculated by the color and depth calculator 22 as shown in Equation 18.

$$\hat{d}_B = \frac{c}{4\pi f_m}\hat{\theta}_B. \quad \text{[Equation 18]}$$

A color image may be displayed by combining red, green, and blue color (RGB) values, which are separated from each other. Since each of the pixels Xij (i=1–m, j=1–n) determines only a single red, green, or blue color value, in order to obtain two lost color values, estimation or interpolation of the lost colors from neighboring pixels in the image is performed. Such an implementation is called demosaicing.

The term "demosaicing" is derived from the fact that the color filter array arranged in a mosaic pattern is used prior to the image sensor 10 (see FIG. 1). The mosaic pattern has only one color value for each pixel. The mosaic pattern can be demosaiced to obtain a full-color image. Hence, demosaicing is a method for interpolating an image captured by a color filter array arranged in the mosaic pattern so that all RGB values are related to all pixels.

There are various types of demosaicing. Bilinear interpolation is an example of a type of demosaicing. Bilinear interpolation uses three color planes, which are independently interpolated by using symmetric linear interpolation. Bilinear interpolation uses a pixel closest to a pixel having the same color as a color that is being interpolated.

FIGS. 11A through 11H illustrate a method of interpolating colors lost in a given pixel by using bilinear interpolation according to an exemplary embodiment of the inventive concept. As shown in FIGS. 11A through 11H, bilinear interpolation uses a small support area. The support area has a size of a neighbor of a pixel whose value is considered for a given pixel. Since a small support area is used, memory use and calculation complexity may be minimized.

Figures 11A, 11B:
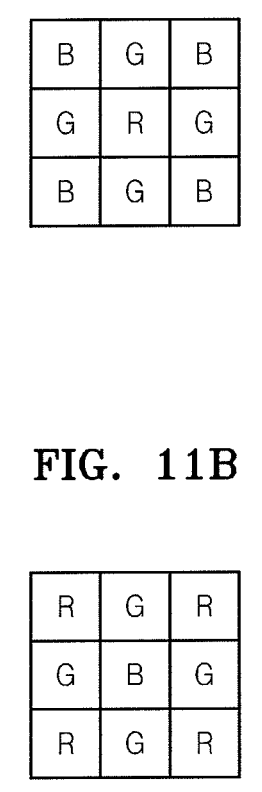

Referring to FIGS. 11A and 11B, bilinear interpolation for finding a green color value in a given pixel is performed. In FIG. 11A, a green color value in a red pixel may be estimated by using green pixels adjacent to the red pixel. Likewise, in FIG. 11B, a green color value in a blue pixel is estimated by using green pixels adjacent to the blue pixel.

Referring to FIGS. 11C through 11E, bilinear interpolation for finding a red color value in a given pixel is performed. In FIG. 11C, a red color value in a green pixel in a red row and a blue column is estimated by using two neighboring red pixels. In FIG. 11D, a red color value in a green pixel in a blue row and a red column is estimated by using two neighboring red pixels in the red column. In FIG. 11E, a red color value in a blue pixel is estimated by using four neighboring red pixels.

Referring to FIGS. 11F through 11H, bilinear interpolation for finding a blue color value in a given pixel is performed. In FIG. 11F, a blue color value in a green pixel in a blue row and a red column is estimated by using two neighboring blue pixels. In FIG. 11G, a blue color value in a green pixel in a red row and a blue column is estimated by using two neighboring blue pixels in the blue column. In FIG. 11H, a blue color value in a red pixel is estimated by using four neighboring blue pixels.

As described above, a full-color image is restored by using red, green, and blue color (RGB) values obtained from a red pixel, a green pixel, and a blue pixel, and a demosaic algorithm for combining the RGB values.

Figure 12:
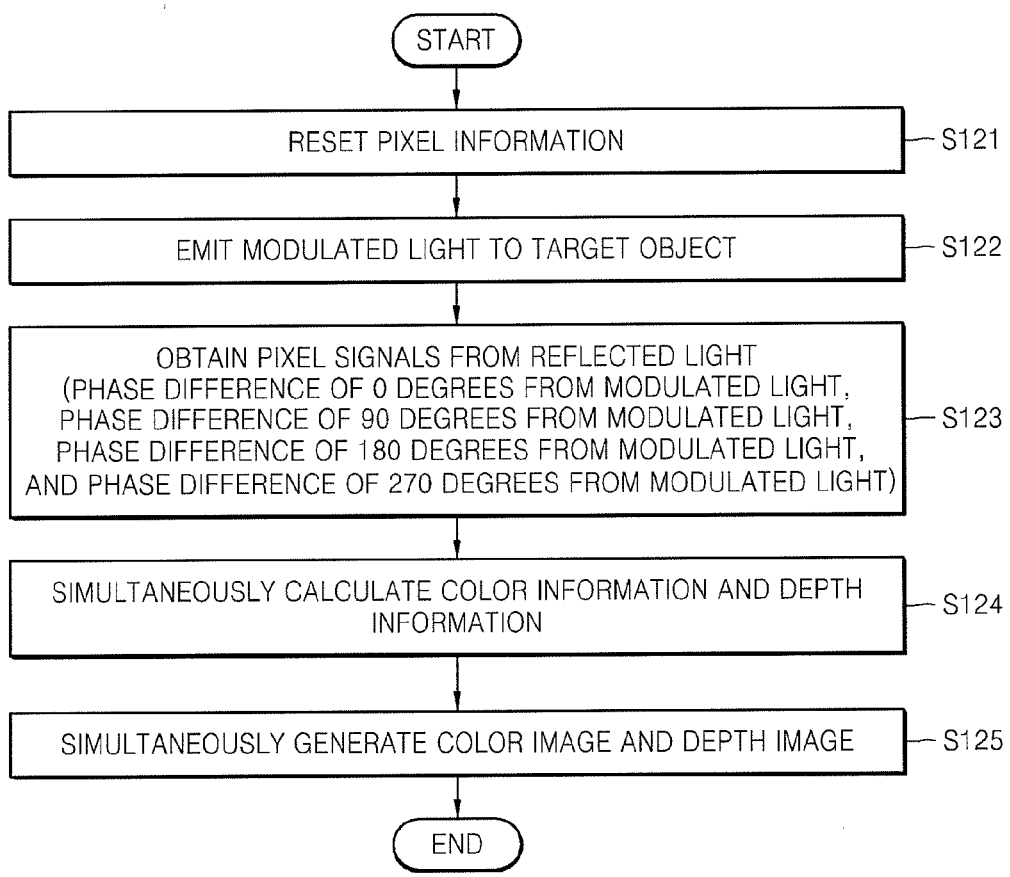
FIG. 12 is a flowchart illustrating a method of operating the image sensor of FIG. 1 according to an exemplary embodiment of the inventive concept.

FIG. 12 is a flowchart illustrating a method of operating the image sensor 10 of FIG. 1 according to an exemplary embodiment of the inventive concept.

Referring to FIG. 12, in operation S121, the image sensor 10 (see FIG. 1) resets pixel information of the pixels Xij (i=1–m, j=1–n).

In operation S122, the light source 50 emits modulated light to the target object 52.

In operation S123, pixel signals of each of the pixels Xij (i=1–m, j=1–n) are obtained from light reflected by the target object 52. Operation S123 is performed by using pixel signals corresponding to the number of electrons generated by the pixels Xij (i=1–m, j=1–n) when the first through fourth gate signals GA, GB, GC, and GD having predetermined phase differences from the modulated light of the light source 50 are applied to each of the pixels Xij (i=1–m, j=1–n). For example, operation S123 may be performed by using the first through fourth gate signals GA, GB, GC, and GD respectively having phase differences of 0, 90, 180, and 270 degrees from the modulated light of the light source 50. Pixel signals are obtained from corresponding color pixels in response to the first through fourth gate signals GA, GB, GC, and GD. For example, the digital pixel signals A0,R, A1,R, A2,R, and A3,R are obtained from the pixel signals A'0,R, A'1,R, A'2,R, and A'3,R of Equation 7 measured in the pixel X11 of FIG. 7. The digital pixel signals A0,G, A1,G, A2,G, and A3,G are obtained from the pixel signals A'0,G, A'1,G, A'2,G, and A'3,G of Equation 9 measured in the pixel X12. The digital pixel signals A0,B, A1,B, A2,B, and A3,B are obtained from the pixel signals A'0,B, A'1,B, A'2,B, and A'3,B of Equation 11 measured in the pixel X22.

In operation S124, color information and depth information are simultaneously calculated from the digital pixel signals A0,B, A1,B, A2,B, and A3,B of the pixel X22. Red color information $C_R$ of the pixel X11 is calculated as shown in Equation 8, green color information $C_G$ of the pixel X12 is calculated as shown in Equation 12, and blue color information $C_B$ of the pixel X22 is calculated as shown in Equation 16. At the same time, depth information $\hat{d}_R$ of the pixel X11 is calculated as shown in Equation 10, depth information $\hat{d}_G$ of the pixel X12 is calculated as shown in Equation 14, and depth information $\hat{d}_B$ of the pixel X22 is calculated as shown in FIG. 18.

In operation S125, a color image and a depth image of a corresponding pixel are simultaneously generated based on the color information and the depth information calculated in operation S124. Operation S125 generates a color image of the target object 52 by combining color information of the plurality of pixels Xij (i=1–m, j=1–n), and generates a depth image of the target object 52 by combining depth information of the plurality of pixels Xij (i=1–m, j=1–n). In operation S125, a full-color image may be generated by using RGB values obtained by a red pixel, a green pixel, and a blue pixel, and by using a demosaic algorithm (see FIGS. 11A through 11H) for combining the RGB values.

The method of operating the image sensor 10 of FIG. 12 may be implemented as computer instructions, which may be executed by various computer means, and recorded on a computer-readable recording medium. The computer-readable recording medium may include program commands, data files, data structures, or a combination thereof. The program commands recorded on the computer-readable recording medium may be specially designed and constructed for the inventive concept and usable by one of ordinary skill in the field of computer software.

Examples of the computer-readable recording medium include a magnetic medium such as a hard disk, a floppy disk, or a magnetic tape, an optical medium such as a compact disk-read only memory (CD-ROM) or a digital versatile disk (DVD), a magneto-optical medium such as a floptical disk, and hardware specially constructed to store and perform program commands such as a read-only memory (ROM), a random access memory (RAM), or a flash memory.

Examples of the program commands include a high-level language code that may be executed by a computer using an interpreter as well as a machine language code made by a compiler. Hardware described herein may be embodied as one or more software modules to implement the present invention.

Figure 13:
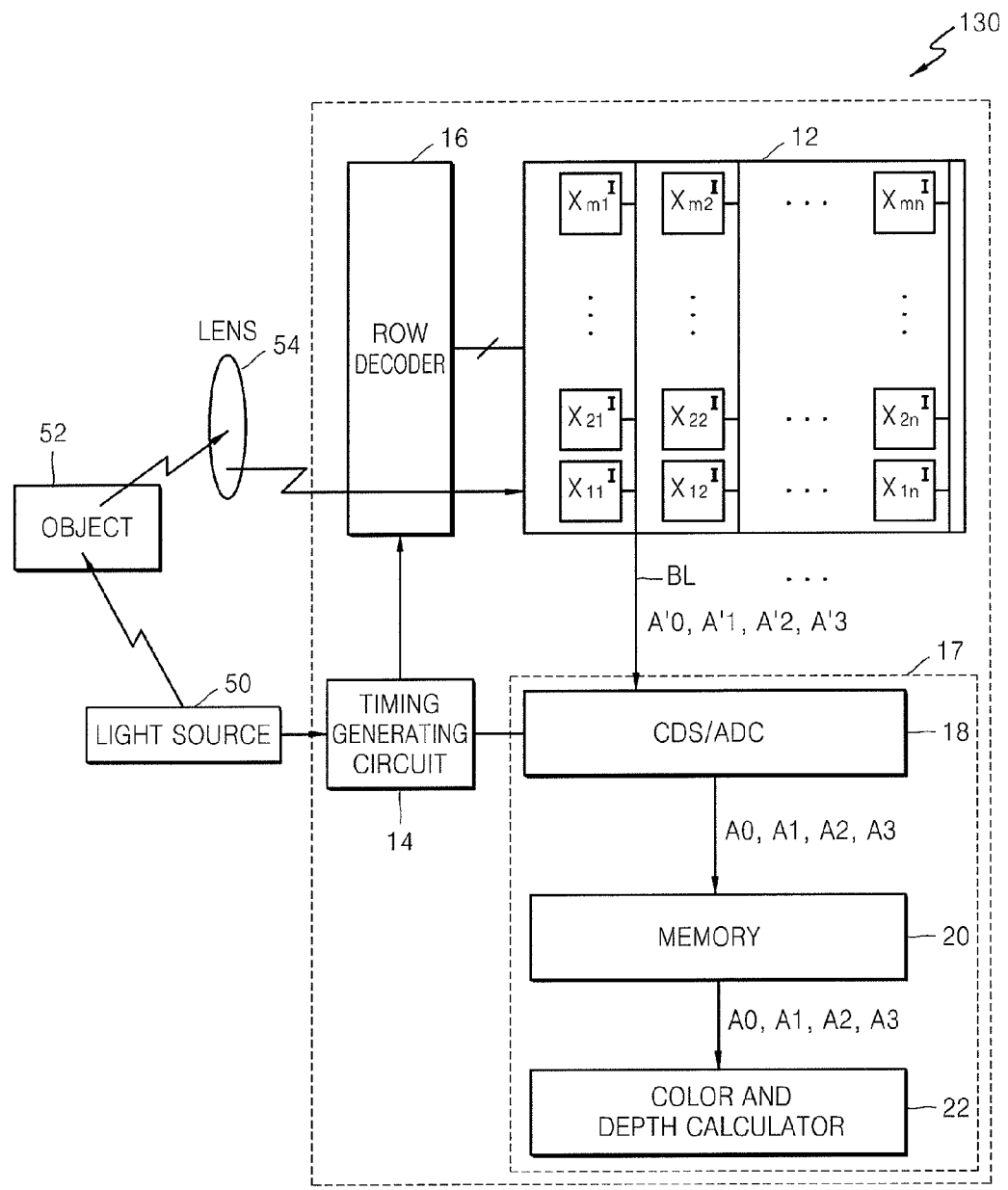
FIG. 13 is a block diagram illustrating an image sensor according to an exemplary embodiment of the inventive concept.

FIG. 13 is a block diagram illustrating an image sensor 130 according to an exemplary embodiment of the inventive concept.

Referring to FIG. 13, the image sensor 130 is different from the image sensor 10 of FIG. 1 in that a plurality of pixels Xij' (i=1–m, j=1–n) in the pixel array 12 have a 1-tap pixel structure. In the 1-tap pixel structure, one photoelectric conversion element is formed in a photoelectric conversion area. Since other elements are the same, a detailed explanation thereof will not be given.

Modulated light EL emitted as a pulse signal from the light source 50 reaches the target object 52 and reflected light RL is reflected by the target object 52 and is incident on the image sensor 130 through the lens 54. When first through fourth gate signals GA, GB, GC, and GD having predetermined phase differences from the modulated light EL of the light source 50 are applied to each of the pixels Xij' (i=1–m, j=1–n), pixel signals are generated to correspond in number to electrons generated in a photoelectric conversion area of each of the pixels Xij' (i=1–m, j=1–n).

Pixel signals A'0, A'1, A'2, and A'3 output from one pixel X11' from among pixel signals of one selected row of the pixel array 12 are transferred to the CDS/ADC 18 of the image processing unit 17 through one bit line BL. For convenience of explanation, the pixel signals A'0, A'1, A'2, and A'3 output from the pixel X11' from among the pixel signals of the one selected row are transferred to the CDSADC 18 through one bit line BL. The CDS/ADC 18 compares the pixel signals A'0, A'1, A'2, and A'3 with a lamp signal to obtain resultant signals, and converts the resultant signals into digital pixel signals A0, A1, A2, and A3. The memory 20 stores the digital pixel signals A0, A1, A2, and A3 output from the CDS/ADC 18, and provides the digital pixel signals A0, A1, A2, and A3 to the color and depth calculator 22 that generates a color and a depth image. The color and depth calculator 22 generates a color image by calculating color information of the pixel X11', and generates a depth image by calculating depth information of the pixel X11' based on the digital pixel signals A0, A1, A2, and A3.

FIGS. 14A through 14D are circuit diagrams illustrating equivalent circuits of the pixel X11' of the image sensor 130 of FIG. 13 according to an exemplary embodiment of the inventive concept.

Figure 14A:
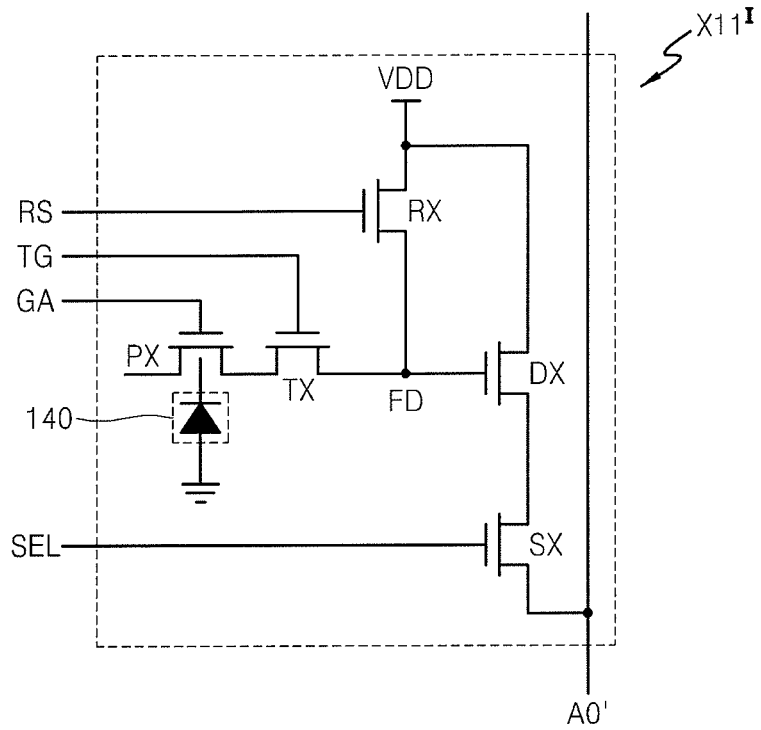
FIGS. 14A through 14D are circuit diagrams illustrating equivalent circuits of one pixel of the image sensor of FIG. 13 according to an exemplary embodiment of the inventive concept.

Referring to FIG. 14A, the pixel X11' includes a transfer transistor TX, a drive transistor DX, a select transistor SX, and a reset transistor RX connected to a photo-gate PX, like any one site of the 2-tap pixel structure of FIG. 2.

A photoelectric conversion area 140 may be capable of sensing light. The photoelectric conversion area 140 generates EHPs by using the sensed light. A depletion area is formed in the photo-gate PX due to a voltage applied as the first gate signal GA, electrons and holes of the EHPs are separated from each other due to the depletion area, and the electrons are accumulated under the photo-gate PX.

The transfer transistor TX has a gate to which a transfer signal TG is applied, a drain to which the photo-gate PX is connected, and a source to which a floating diffusion area FD is connected. The transfer transistor TX transfers the electrons under the photo-gate PX to the floating diffusion area FD in response to the transfer signal TG. The transfer transistor TX electrically connects or separates the photo-gate PX and the floating diffusion area FD by using the transfer signal TG.

The drive transistor DX has a gate to which the floating diffusion area FD is connected, a drain to which a power voltage VDD is applied, and a source to which the select transistor SX is connected. A voltage of a source terminal of the drive transistor DX is determined by a voltage of the floating diffusion area FD. The voltage of the floating diffusion area FD is determined by the number of electrons transferred from the photo-gate PX.

The select transistor SX has a gate to which a select signal SEL is applied, which is a row control signal, a drain to which the source of the drive transistor DX is connected, and a source to which a bit line (not shown) of the pixel array 12 is connected. The pixel signal A'0 is output to the bit line BL of the pixel array 12.

The reset transistor RX has a gate to which a reset signal RS is applied, a drain to which the power voltage VDD is applied, and a source to which the floating diffusion area FD is connected. After pixel information detection is performed based on the voltage of the floating diffusion area FD, if the reset signal RS is enabled, the reset transistor RX resets the voltage of the floating diffusion area FD to the power voltage VDD.

Figure 14B:
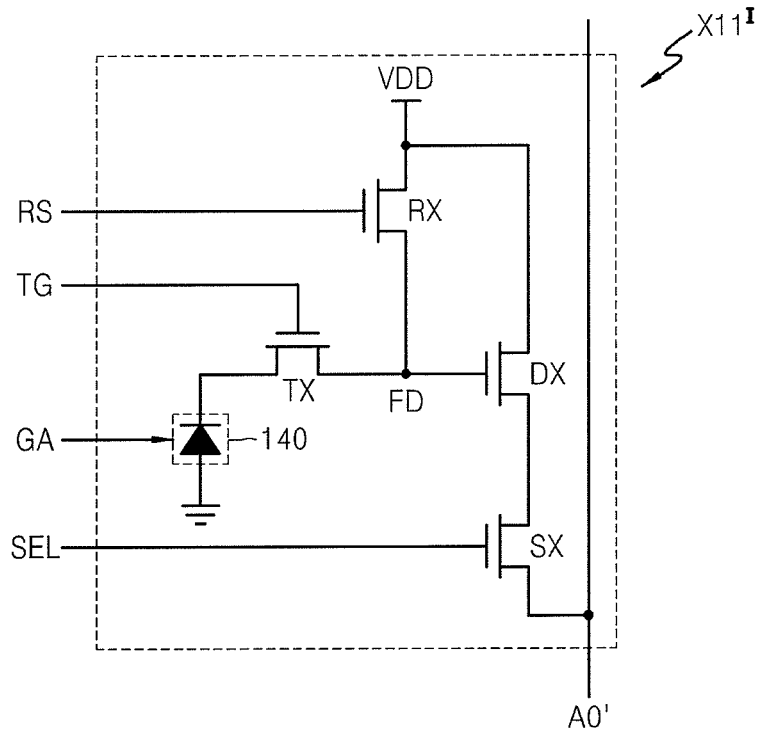

Referring to FIG. 14B, the pixel X11' has a 1-tap pixel structure in which one photoelectric conversion element 140 is formed in a photoelectric conversion area. The photoelectric conversion element 140 is an element for sensing light, for example, a photodiode, a phototransistor, a photo-gate, or a pinned photo-gate. The pixel X11' includes a transfer transistor TX, a drive transistor DX, a select transistor SX, and a reset transistor RX connected to the photoelectric conversion element 140.

The photoelectric conversion element 140 generates EHPs by using the sensed light. A depletion area is formed in the photoelectric conversion element 140 due to a voltage applied as the first gate signal GA, and electrons and holes of the EHPs are separated from each other due to the depletion area.

The transfer transistor TX has a gate to which a transfer signal TG is applied, a drain to which the photoelectric conversion element 140 is connected, and a source to which a floating diffusion area FD is connected. The transfer transistor TX transfers the electrons of the photoelectric conversion element 140 to the floating diffusion area FD in response to the transfer signal TG. The transfer transistor TX electrically connects or separates the photoelectric conversion element 140 and the floating diffusion area FD by using the transfer signal TG.

The drive transistor DX has a gate to which the floating diffusion area FD is connected, a drain to which a power voltage VDD is applied, and a source to which the select transistor SX is connected. A voltage of a source terminal of the drive transistor DX is determined by a voltage of the floating diffusion area FD. The voltage of the floating diffusion area FD is determined by the number of electrons transferred from the photo-gate PX.

The select transistor SX has a gate to which a select signal SEL is applied, which is a row control signal, a drain to which the source of the drive transistor DX is connected, and a source to which a bit line (not shown) of the pixel array 12 (see FIG. 13) is connected. The pixel signal A'0 is output from the bit line BL of the pixel array 12.

The reset transistor RX has a gate to which a reset signal RS is applied, a drain to which the power voltage VDD is applied, and a source to which the floating diffusion area FD is connected. After pixel information detection is performed based on the voltage of the floating diffusion area FD, if the reset signal RS is enabled, the reset transistor RX resets the voltage of the floating diffusion area FD to the power voltage VDD.

Figure 14C:
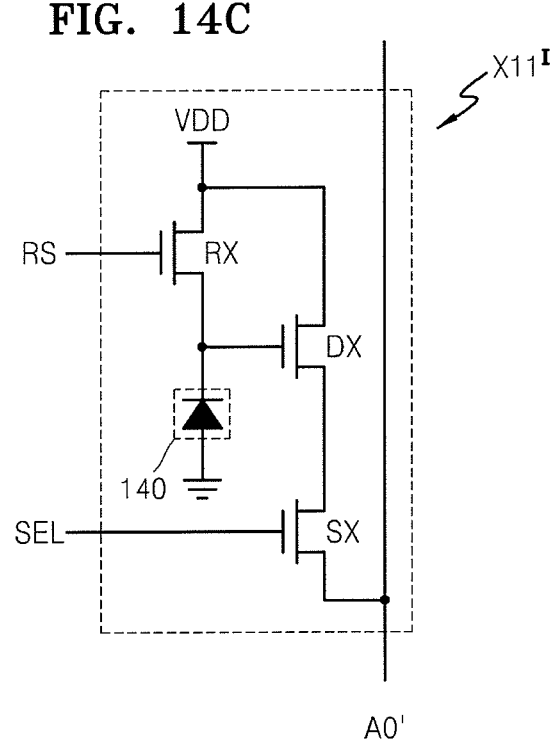

Referring to FIG. 14C, the pixel X11' includes a drive transistor DX, a select transistor SX, and a reset transistor RX connected to the photoelectric conversion element 140.

The photoelectric conversion element 140 generates EHPs by using sensed light. A depletion area is formed in the photoelectric conversion element 140 due to a voltage applied as the first gate signal GA, and electrons and holes of the EHPs are separated from each other due to the depletion area.

The drive transistor DX has a gate to which the photoelectric conversion element 140 is connected, a drain to which a power voltage VDD is applied, and a source to which the select transistor SX is connected. A voltage of a source terminal of the drive transistor DX is determined by a voltage of the photoelectric conversion element 140.

The select transistor SX has a gate to which a select signal SEL is applied, which is a row control signal, a drain to which the source of the drive transistor DX is connected, and a source to which a bit line (not shown) of the pixel array 12 (see FIG. 13) is connected. The pixel signal A'0 is output from the bit line BL of the pixel array 12.

The reset transistor RX has a gate to which a reset signal RS is applied, a drain to which the power voltage VDD is applied, and a source to which the photo-gate PX is connected. After pixel information detection is performed based on a voltage of the floating diffusion area FD, if the reset signal RS is enabled, the reset transistor RX resets the voltage of the floating diffusion area FD to the power voltage VDD.

Figure 14D:
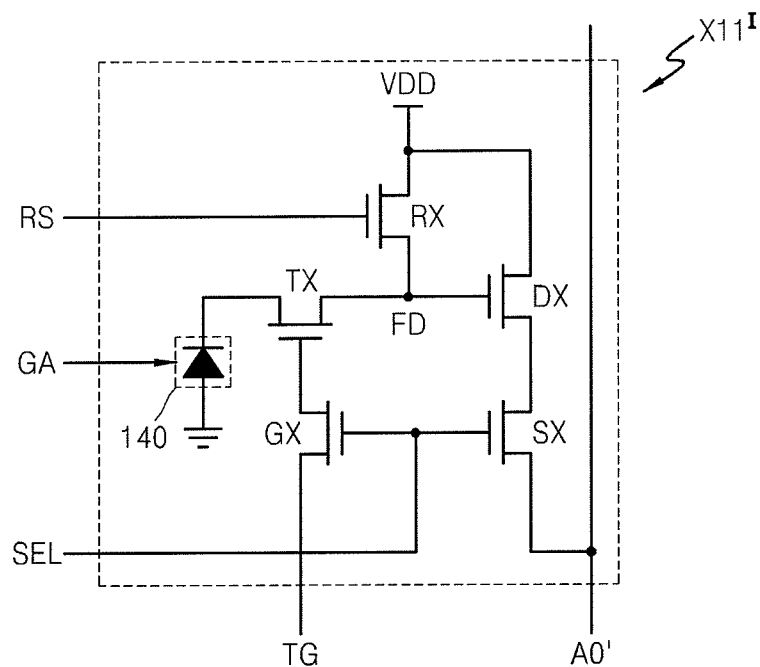

Referring to FIG. 14D, the pixel X11' includes a reset transistor RX, a control transistor GX, a drive transistor DX, a select transistor SX, and a transfer transistor TX connected to the photoelectric conversion element 140.

The photoelectric conversion element 140 generates EHPs by using sensed light. A depletion area is formed in the photoelectric conversion element 140 due to a voltage applied as the first gate signal GA, and electrons and holes of the EHPs are separated from each other due to the depletion area.

The transfer transistor TX has a gate to which a drain of the control transistor GX is connected, a drain to which the photoelectric conversion element 140 is connected, and a source to which a floating diffusion area FD is connected. The transfer transistor TX transfers electrons of the photoelectric conversion element 140 to the floating diffusion area FD in response to a transfer signal TG provided through the control transistor GX. The transfer transistor TX electrically connects or separates the photoelectric conversion element 140 and the floating diffusion area FD by using the transfer signal TG.

The control transistor GX has a gate to which a select signal SEL is applied, a drain to which the gate of the transfer transistor TX is connected, and a source to which the transfer signal TG is applied. The control transistor GX provides the transfer signal TG to the gate of the transfer transistor TX in response to the select signal SEL.

The drive transistor DX has a gate to which the floating diffusion area FD is connected, a drain to which a power voltage VDD is applied, and a source to which the select transistor SX is connected. A voltage of a source terminal of the drive transistor DX is determined by a voltage of the floating diffusion area FD. The voltage of the floating diffusion area FD is determined by the number of electrons transferred from the photo-gate PX.

The select transistor SX has a gate to which the select signal SEL is applied, which is a row control signal, a drain to which the source of the drive transistor DX is connected, and a source to which a bit line (not shown) of the pixel array 12 (see FIG. 13) is connected. The pixel signal A'0 is output from the bit line BL of the pixel array 12.

The reset transistor RX has a gate to which a reset signal RS is applied, a drain to which the power voltage VDD is applied, and a source to which the floating diffusion area FD is connected. After pixel information detection is performed based on the voltage of the floating diffusion area FD, if the reset signal RS is enabled, the reset transistor RX resets the voltage of the floating diffusion area FD to the power voltage VDD.

Figure 15:
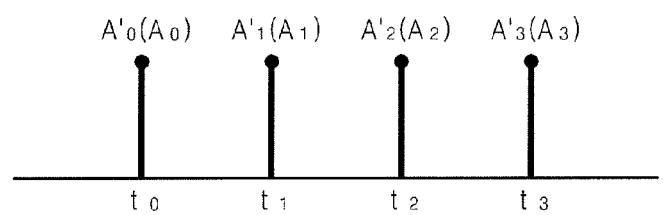
FIG. 15 is a diagram illustrating first through fourth pixel signals output from the pixel of FIG. 14A according to an exemplary embodiment of the inventive concept.

FIG. 15 is a diagram illustrating the first through fourth pixel signals A'0, A'1, A'2, and A'3 output from the pixel X11$^I$ of FIG. 14A.

Referring to FIG. 15, at a first time t0, the first pixel signal A'0 is output in response to the first gate signal GA having a phase difference of 0 degrees from modulated light emitted from the light source 50 (see FIG. 13) to the photo-gate PX of the pixel X11$^I$ of FIG. 14A. At a second time t1, the second pixel signal A'1 is output in response to the second gate signal GB having a phase difference of 90 degrees from the modulated light. At a third time t3, the third pixel signal A'2 is output in response to the third gate signal GC having a phase difference of 180 degrees from the modulated light. At a fourth time t3, the fourth pixel signal A'3 is output in response to the fourth gate signal GD having a phase difference of 270 degrees from the modulated light.

The first through fourth pixel signals A'0, A'1, A'2, and A'3 of the pixel X11$^I$ are subjected to correlated double sampling through the CDS/ADC 18 (see FIG. 13), are subjected to analog-to-digital conversion, and are respectively output as first through fourth digital pixel signals A0, A1, A2, and A3.

The color and depth calculator 22 (see FIG. 13) calculates color information C by summing the first through fourth digital pixel signals A0, A1, A2, and A3 of the pixel X11$^I$ according to Equation 19 below. A color image of the pixel X11$^I$ is determined by a color filter combined with the pixel X11$^I$.

$$C = A_0 + A_1 + A_2 + A_3 \quad \text{[Equation 19]}$$

The color and depth calculator 22 estimates a phase difference $\hat{\theta}$ of the pixel X11$^I$ from the first through fourth digital pixel signals A0, A1, A2, and A3 of the pixel X11$^I$ based on Equation 20, and calculates depth information $\hat{d}$.

$$\hat{\theta} = \tan^{-1} \frac{A_1(t_1) - A_3(t_3)}{A_0(t_0) - A_2(t_2)} \quad \text{[Equation 20]}$$

$$\hat{d} = \frac{c}{4\pi f_m} \hat{\theta}$$

A color image and a depth image of the target object 52 are generated based on the color information C and the depth information $\hat{d}$ of each pixel obtained by using Equation 19 and Equation 20. For example, a color image of the target object 52 is generated by combining the color information C of the plurality of pixels Xij$^I$ (i=1−m, j=1−n) and a depth image of the target object 52 is generated by combining the depth information $\hat{d}$ of the plurality of pixels Xij$^I$ (i=1−m, j=1−n).

The image sensors 10 and 130 of FIGS. 1 and 13 may be applied to various fields and used within various devices. For example, the image sensors 10 and 130 may be used within a camera, a camcorder, an infrared microscope, an infrared telescope, and applied to fields such as multimedia, optical communication (both fiber and free space), laser detection and ranging (LADAR). The image sensors 10 and 130 may also be used within a thermal imaging system, which is a medical system for measuring and analyzing temperature variations on a surface of the body without causing pain or discomfort. The thermal imaging system can output medical information about disease to aid in preventing the disease from further progressing. As further examples, the image sensors 10 and 130 may be used in an environment monitoring system for unmanned forest fire observation or marine pollution prevention, a temperature monitoring system in a semiconductor process line, a structure insulation deterioration and water leakage detecting system, an electric/electronic printed circuit board (PCB) circuit, and a part checking system.

Figure 16:
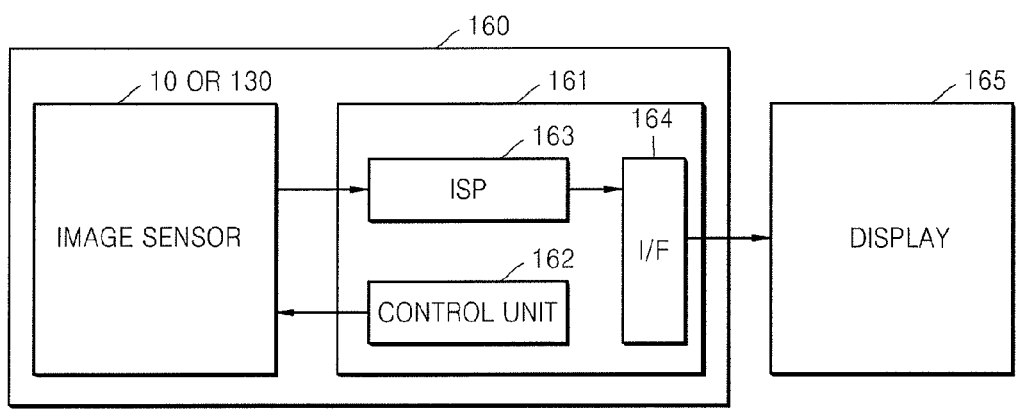
FIG. 16 is a block diagram illustrating an image processing system using the image sensor of FIG. 1 or the image sensor of FIG. 13 according to an exemplary embodiment of the inventive concept.

FIG. 16 is a block diagram illustrating an image processing system 160 using the image sensor 10 of FIG. 1 or the image sensor 130 of FIG. 13 according to an exemplary embodiment of the inventive concept.

Referring to FIG. 16, the image processing system 160 includes a processor 161 coupled to the image sensor 10 of FIG. 1 or the image sensor 130 of FIG. 13. The processor 160 and the image sensor 10 or 130 may be on the same integrated circuit or on separate integrated circuits. The processor 161 may be a microprocessor, an image processor, or another type of control circuit such as an application-specific integrated circuit (ASIC). The processor 161 includes an image sensor control unit 162, an image signal processing unit 163, and an interface unit 164. The image sensor control unit 162 outputs a control signal to the image sensor 10 or 130. The image signal processing unit 163 receives and processes image data including a color image and a depth image output from the image sensor 10 or 130. The interface unit 164 transfers the processed data to a display 165 to be reproduced.

Figure 17:
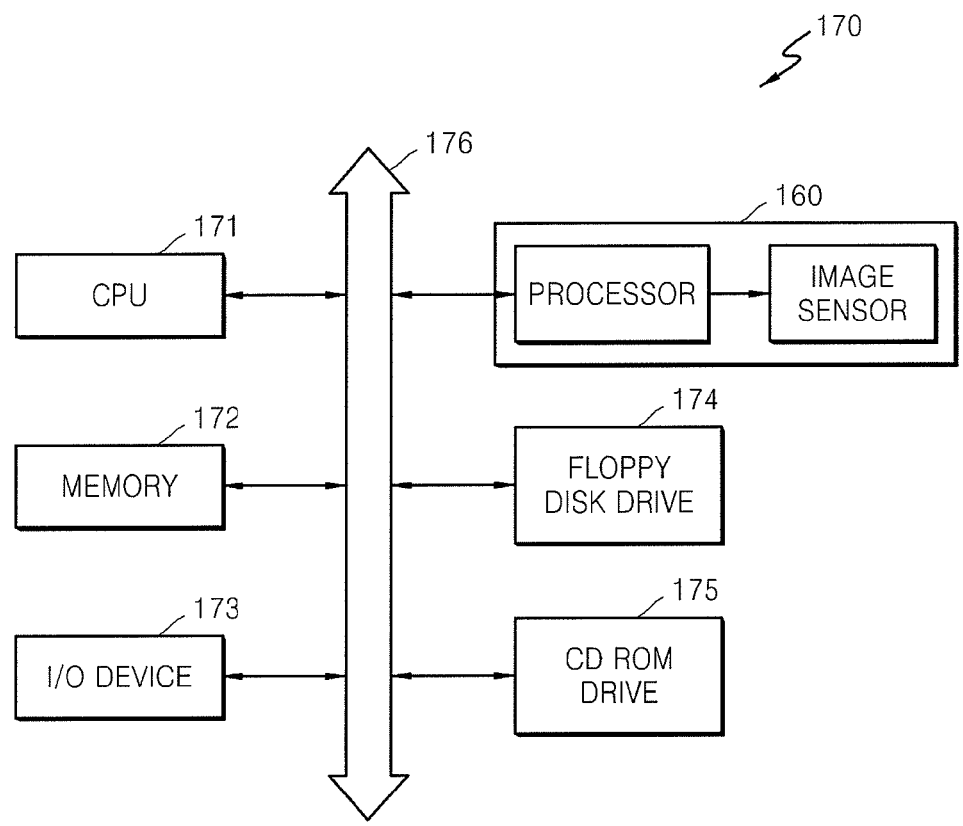
FIG. 17 is a block diagram illustrating a computer system including the image processing system of FIG. 16 according to an exemplary embodiment of the inventive concept.

FIG. 17 is a block diagram illustrating a computer system 170 including the image processing system 160 of FIG. 16 according to an exemplary embodiment of the inventive concept.

Referring to FIG. 17, the computer system 170 includes the image processing system 160. The computer system 170 may further include a central processing unit 171, a memory 172, and an input/output (I/O) device 173. The computer system 170 may further include a floppy disk drive 174 and a CD-ROM drive 175. The computer system 170 is connected to the central processing unit 171, the memory 172, the I/O device 173, the floppy disk drive 174, the CD-ROM drive 175, and the image processing system 160 via a system bus 176. Data provided through the I/O device 173 or the image processing system 160 or data processed by the central processing unit 171 is stored in the memory 172. The memory 172 may include a RAM. The memory 172 may be a memory card or a semiconductor disk device (SSD) including a nonvolatile memory device such as a NAND flash memory.

The image processing system 160 includes the processor 161 for controlling the image sensor 10 or the image sensor 130. The image sensor 10 or 130 includes a plurality of pixels, and simultaneously receives a color image and a depth image from at least one pixel from among the plurality of pixels. The image sensor 10 or 130 generates a depth image of an object by combining depth information of the plurality of pixels.

While the inventive concept has been particularly shown and described with reference to exemplary embodiments thereof, it will be understood that various changes in form and details may be made therein without departing from the spirit and scope of the disclosure.

What is claimed is:

1. An image sensor comprising:
   a light source that emits modulated light to a target object;
   a plurality of pixels that comprises at least one pixel for outputting pixel signals according to light reflected by the target object;
   an image processing unit that simultaneously generates a color image and a depth image from the pixel signals of the at least one pixel; and
   a row decoder that outputs gate signals having predetermined phase differences from the modulated light to the at least one pixel outputting the pixel signals, wherein the at least one pixel comprises a photo-gate that responds to the gate signals in a photoelectric conversion area, and wherein the gate signals include first through fourth gate signals respectively having phase differences of 0, 90, 180, and 270 degrees from the modulated light, which are applied by the row decoder sequentially to the photo-gate to output first through fourth pixel signals.

2. The image sensor of claim 1, wherein the image processing unit comprises:
a color calculator that generates the color image by summing the first through fourth pixel signals; and
a depth calculator that generates the depth image based on an arc tangent of a ratio of a difference between the second pixel signal and the fourth pixel signal to a difference between the first pixel signal and the third pixel signal.

3. The image sensor of claim 1, wherein the photo-gate comprises first and second photo-gates that respond to the gate signals in a photoelectric conversion area,
wherein the first and third gate signals respectively have phase differences of 0 and 180 degrees from the modulated light, which are simultaneously applied by the row decoder to the first and second photo-gates to output the first and third pixel signals, and the second and fourth gate signals respectively have phase differences of 90 and 270 degrees from the modulated light, which are simultaneously applied by the row decoder to the first and second photo-gates to output the second and fourth pixel signals.

4. The image sensor of claim 3, wherein the image processing unit comprises:
a color calculator that generates the color image by summing the first through fourth pixel signals; and
a depth calculator that generates the depth image based on an arc tangent of a ratio of a difference between the second pixel signal and the fourth pixel to a difference between the first pixel signal and the third pixel signal.

5. The image sensor of claim 1, wherein the modulated light is visible light, white light, or white light-emitting diode (LED) light.

6. The image sensor of claim 1, wherein the image sensor generates a color image of the target object by combining color images of the plurality of pixels.

7. The image sensor of claim 1, wherein the image sensor generates a depth image of the target object by combining depth images of the plurality of pixels.

8. A method of operating an image sensor, the method comprising:
emitting modulated light from a light source to a target object;
acquiring pixel signals from at least one pixel on which light reflected by the target object is incident; and
simultaneously generating a depth image and a color image from the pixel signals,
wherein the at least one pixel comprises one photo-gate in a photoelectric conversion area,
wherein the method includes sequentially applying first through fourth gate signals respectively having phase differences of 0, 90, 180, and 270 degrees from the modulated light to the photo-gate to output first through fourth pixel signals.

9. The method of claim 8, wherein the simultaneously generating of the depth image and the color image comprises:
generating the color image by summing the first through fourth pixel signals; and
generating the depth image based on an arc tangent of a ratio of a difference between the second pixel signal and the fourth pixel signal to a difference between the first pixel signal and the third pixel signal.

10. The method of claim 8, wherein the modulated light is visible light, white light, or white LED light.

11. A method of operating an image sensor, the method comprising:
emitting modulated light from a light source to a target object;
acquiring pixel signals from at least one pixel on which light reflected by the target object is incident; and
simultaneously generating a depth image and a color image from the pixel signals,
wherein the at least one pixel comprises first and second photo-gates in a photoelectric conversion area,
wherein the method includes applying first and third gate signals respectively having phase differences of 0 and 180 degrees from the modulated light to the first and second photo-gates to output first and third pixel signals, and then applying second and fourth gate signals respectively having phase differences of 90 and 270 degrees from the modulated light to the first and second photo-gates to output second and fourth pixel signals.

12. The method of claim 11, wherein the simultaneously generating of the depth image and the color image comprises:
generating the color image by summing the first through fourth pixel signal; and
generating the depth image based on an arc tangent of a ratio of a difference between the second pixel signal and the fourth pixel signal to a difference between the first pixel signal and the third pixel signal.

13. An image sensor comprising:
a pixel including a photo-gate that is arranged to receive reflected light based on a modulated light reflected from a target object; and
a row decoder configured to sequentially apply first through fourth gate signals to the photo-gate respectively having phase differences of 0, 90, 180, and 270 degrees from the modulated light to generate first through fourth pixels signals.

14. The image sensor of claim 13, further comprising:
a color calculator that generates a color image by summing the first through fourth pixel signals; and
a depth calculator that generates a depth image based on an arc tangent of a ratio of a difference between the second pixel signal and the fourth pixel signal to a difference between the first pixel signal and the third pixel signal.

15. The image sensor of claim 13, wherein the pixel comprises:
a semiconductor substrate, wherein the photo-gate is disposed on top of the substrate;
a second photo-gate disposed on top of the substrate and spaced apart from the photo-gate, wherein the row-decoder is configured to apply a gate signal to the second photo-gate that has a phase difference of 180 degrees with respect to the gate signal that is being currently applied to the other photo-gate.

16. The image sensor of claim 15, wherein the pixel further comprises:
a first charge storage area buried partially in an upper portion of the substrate and disposed to the left of and adjacent the photo-gate; and
a second charge storage area buried partially in an upper portion of the substrate and disposed to the right of and adjacent the second photo-gate, wherein the substrate is of a first conductivity type and the first and second charge storage areas are of a second conductivity type.

17. The image sensor of claim 13, wherein the modulated light is visible light, white light, or white light-emitting diode (LED) light.

* * * * *